United States Patent [19]

Hinman, Jr.

[11] 3,882,361

[45] May 6, 1975

[54] SEGREGATED PHASE COMPARISON RELAYING APPARATUS

[75] Inventor: Walter L. Hinman, Jr., New Providence, N.J.

[73] Assignee: Westinghouse Electric Corporation, Pittsburgh, Pa.

[22] Filed: July 26, 1973

[21] Appl. No.: 382,791

Related U.S. Application Data

[60] Division of Ser. No. 295,031, Oct. 4, 1972, abandoned.

[52] U.S. Cl............ 317/27 R; 317/28 R; 317/29 R; 317/29 A
[51] Int. Cl........................ H02h 3/26; H02h 7/26
[58] Field of Search.... 317/27 R, 27 A, 28 R, 28 B, 317/29 R, 29 A, 29 B

[56] References Cited
UNITED STATES PATENTS

| | | |
|---|---|---|
| 3,295,019 | 2/1966 | Altfather........................... 317/27 R |
| 3,470,418 | 9/1969 | Hagberg et al..................... 317/27 R |
| 3,590,324 | 6/1971 | Rockefeller........................ 317/27 R |
| 3,612,952 | 10/1971 | Hagberg............................. 317/27 R |
| 3,710,189 | 1/1973 | Hagberg............................. 317/27 R |

*Primary Examiner*—J. D. Miller
*Assistant Examiner*—Patrick R. Salce
*Attorney, Agent, or Firm*—J. L. Stoughton

[57] ABSTRACT

A reliable apparatus for protecting a polyphase power transmission line having segregated phase comparison devices which are current actuated and which, due to the absence of reactive elements in the sensing devices, are not adversely affected by transients which occur as a result of line faults or breaker acruation in clearing external line faults.

16 Claims, 22 Drawing Figures

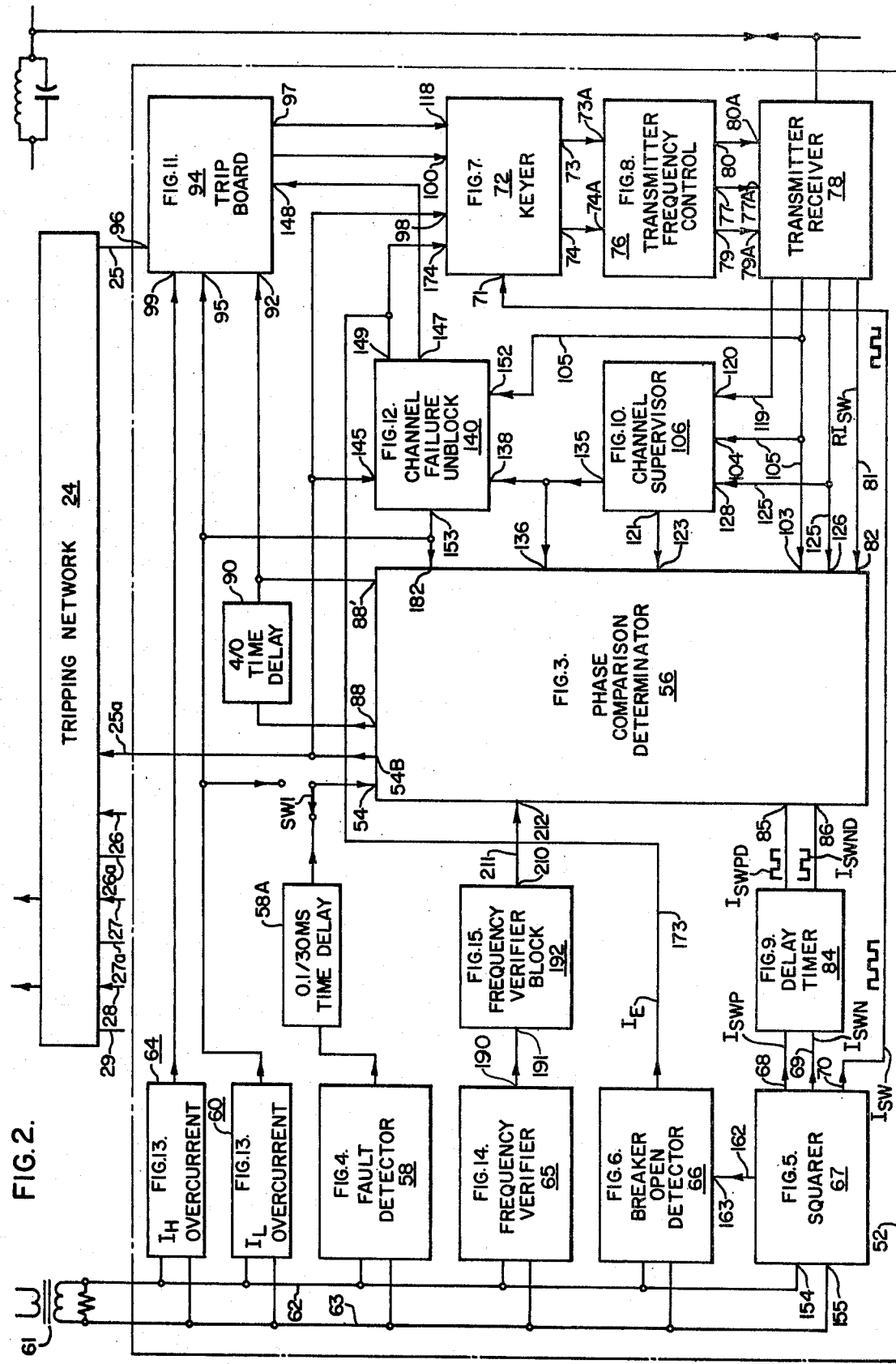

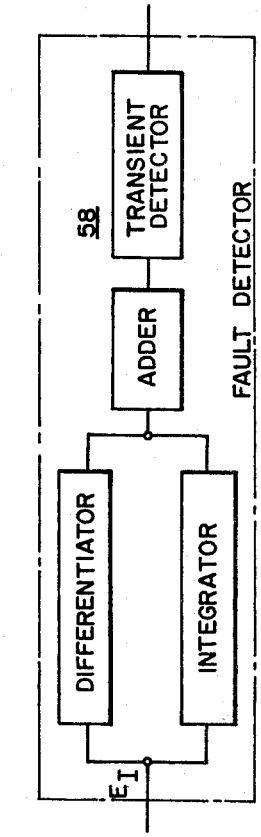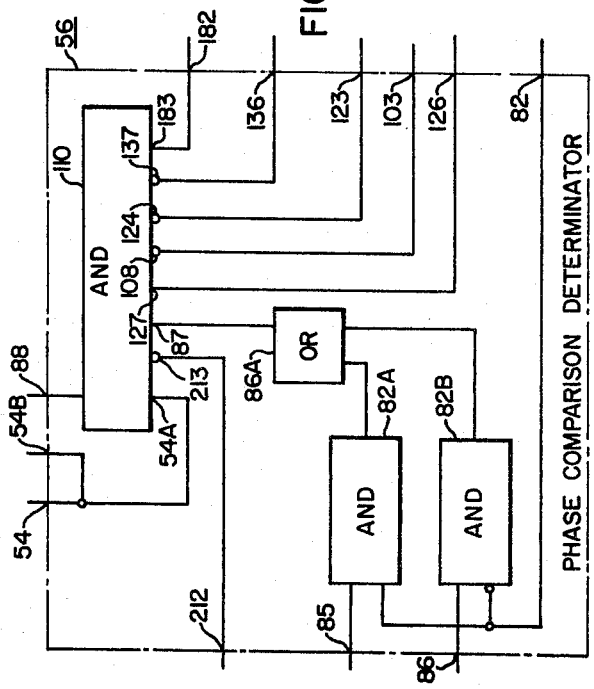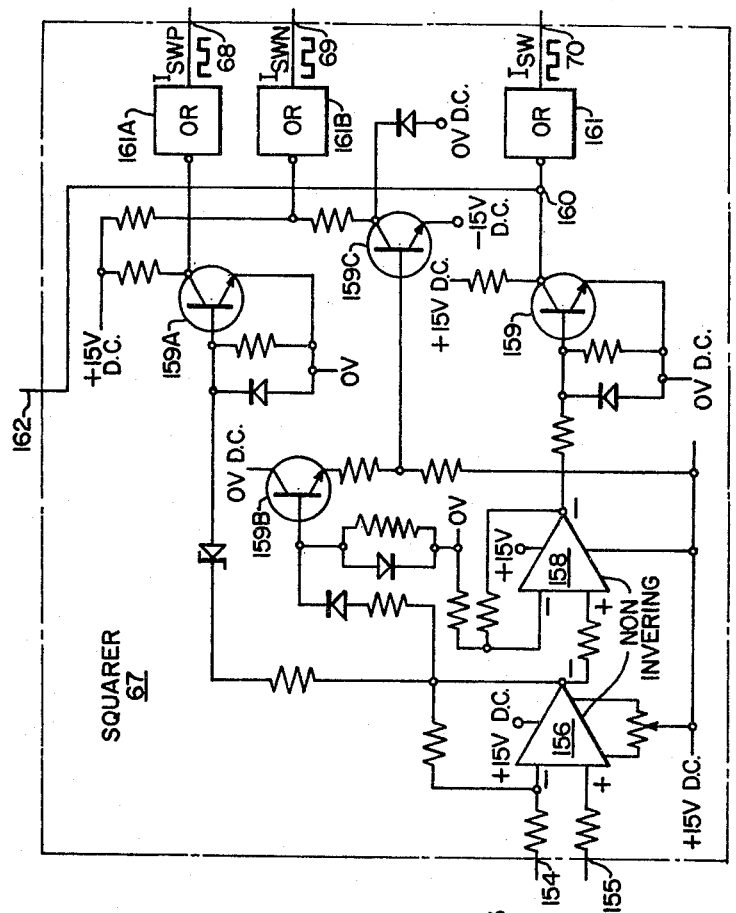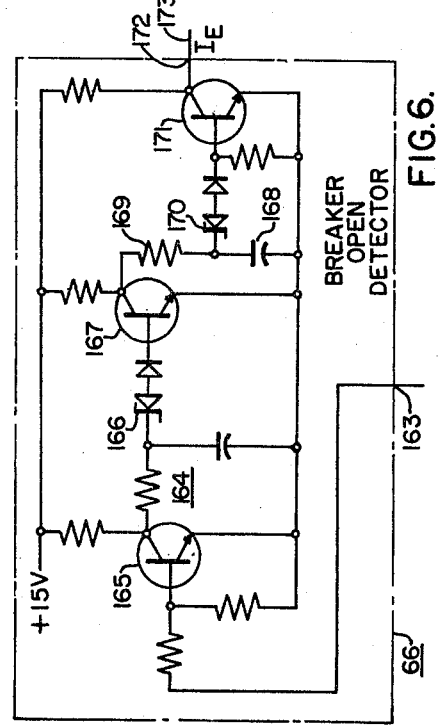

$I_H$ AND $I_L$ OVERCURRENT

FREQUENCY VERIFIER BLOCK

SEGREGATED PHASE COMPARISON RELAYING APPARATUS

This application is a division of copending application Ser. No. 295,031 filed Oct. 4, 1972 for Segregated Phase Comparison Relay Apparatus in the sole name of Walter L. Hinman, Jr. and which parent application was abandoned in favor of continuation application Ser. No. 402,687 filed Oct. 2, 1973.

BRIEF SUMMARY OF THE INVENTION

This invention relates to protecting apparatus for polyphase power transmission lines which is reliable and which is inherently redundant to provide its own "back-up" protection. The apparatus phase compares the current in each phase conductor and the residual current and includes an AND block which prevents breaker tripping operation unless the requisite arming signals are provided thereto.

BRIEF DESCRIPTION OF THE SEVERAL VIEWS OF THE DRAWINGS

FIG. 2 is a more detailed schematic showing of the relaying apparatus which may be associated with the current transformer array which is associated with the three phase conductors;

FIG. 3 is a schematic illustration of the circuitry which may be used to provide the phase comparison determination;

FIG. 4 is a schematic representation of a fault detector which may be used to detect fault current;

FIG. 5 is a schematic diagram of a squarer network;

FIG. 6 is a schematic diagram of a network which responds to a breaker open condition;

Figure 1:
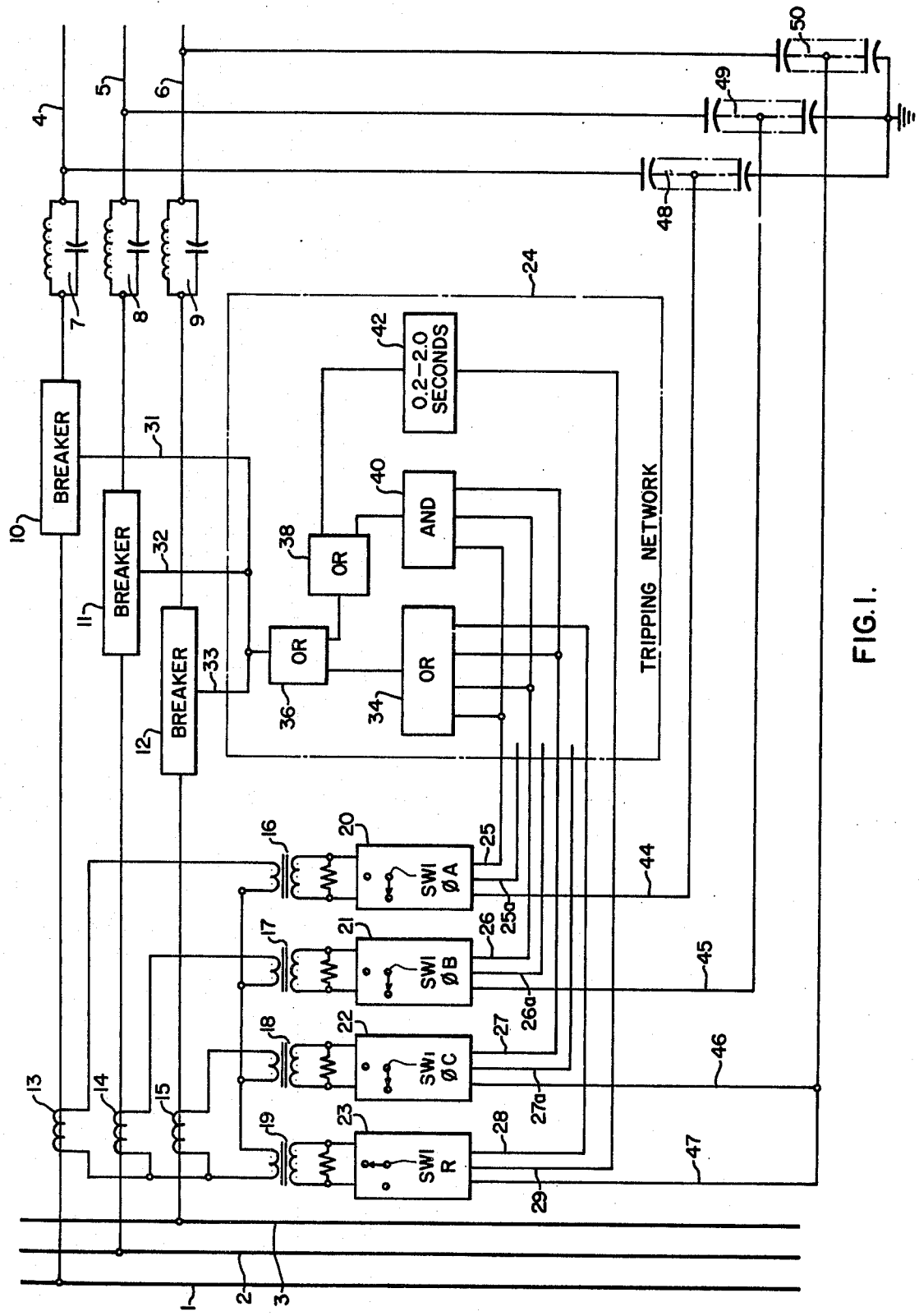
FIG. 1 is a schematic view of a relaying apparatus associated with a three phase power transmission line and embodying the invention.
Figure 8:
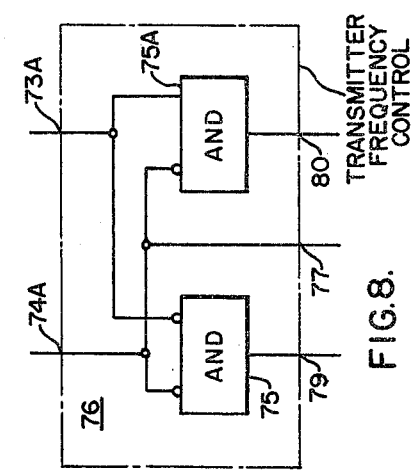
FIG. 8 is a schematic diagram of a transmitter control which may be driven by the keyer of FIG. 7.

Referring to the drawings by characters of reference, the numerals 1, 2 and 3 indicate the phase busses of a three phase power supply and are suitably energized from power sources (not shown). Phase conductors 4, 5 and 6 of a three phase transmission line are energized respectively from the phase busses 1, 2 and 3 through low pass filters 7, 8 and 9 and breakers 10, 11 and 12. The low pass filters 7, 8 and 9 offer substantially no impedance to the transmission of current at the hertz of the transmitted power, but provide a high impedance to current at the power line carrier hertz transmitted over the phase conductors 4, 5 and 6 between the ends of the protected transmission line sections.

Current transformers 13, 14 and 15 are associated with the phase conductors 4, 5 and 6 and provide output quantities which are directly related to the current flowing through the phase conductors 4, 5 and 6. The output of the current transformers 13, 14 and 15 is applied to the primary windings of current isolating transformers 16, 17, 18 and 19 in the usual manner in which the output quantities of the transformers 16, 17 and 18 represent the current flowing through the phase conductors 4, 5 and 6, respectively, and the output of the current transformer 19 is a measure of the residual or ground current. Each of the current transformers 16, 17, 18 and 19 have their secondaries individually connected to energize individual loading resistors so that the output quantities supplied to the phase current responsive relaying networks 20, 21 and 22 and to the residual or ground current relaying network 23 are voltage signals. The relaying or breaker actuating networks 20-23 are provided individually with output conductors 25-28 respectively which normally are de-energized to provide a logical 0 output but which will be energized to provide a logical 1 output in response to the operation of its fault detector to be described below in connection with the description of FIG. 2. The residual or ground network 23 is provided with an additional output conductor 29, normally provided with a logical 0 output. The network 23 will cause the conductor to have a logical 1 output whenever the magnitude of the ground current is above a predetermined minimum irrespective of the operation of its relationship to the ground or residual current at the remote end of the protected line section.

A breaker tripping or actuating network 24 includes a plurality of OR networks — 34, 36 and 38, an AND network 40, and a timing network 42. The OR network 34 has four inputs which are connected individually to the output conductors 25, 26, 27 and 28 and a single output which is connected to one of the two inputs of the OR network 36. The AND network 40 has three inputs which are connected individually to the output conductors 25, 26 and 27 and a single output which is connected to one of the two inputs of OR network 38. The timing network 42 provides a time delay between the energization of its input by the ouput conductor 29 and energization of its output which is connected to the second input terminal of the OR network 38. The timing network 42 may, for example, have a time delay of 0.2 to 2.0 seconds which interval is considerably longer than any interval required to trip the breakers by the networks 20-23 in response to the energization of their fault detectors. It will be appreciated that when a logical 1 signal is supplied to any one or more of the inputs to the OR network 34 it supplies a logical 1 signal to the OR network 36 which in turn provides a logical 1 tripping signal to all of the breakers 10, 11 and 12. Likewise, the OR network 36 may be supplied with a logical 1 signal to trip the breakers 10, 11 and 12 when provided with a logical 1 output from the AND network 40 or from the timing network 42.

The networks 20, 21, 22 and 23 are coupled to the phase conductors 4, 5 and 6 through second output conductors 44, 45, 46 and 47 and coupling capacitors 48, 49 and 50. The networks 20–23 each transmit and receive intelligence signals at power line carrier frequencies to and from current responsive relaying networks similar to networks 20–23 and located at the remote end of the protected line section and similarly coupled thereto. Only the relaying networks 20–23 at the local end of the transmission line are illustrated in FIG. 1.

While the transmission of intelligence between the remote and local stations is illustrated in this application as being by power line carrier, it will be understood that other means may be used to transmit the intelligence, such as microwave or leased telephone circuits, among others. The particular type of transmission is unimportant as long as it will transmit the proper intelligence therebetween.

For purposes of simplifying the disclosure only a single relaying network 52 is illustrated in FIG. 2. The network 52 may be used for any of the phase current or ground current responsive relaying networks 20, 21, 22 and 23. When used as a phase current network 20, 21 or 22 the switch SW1 is in the illustrated position to connect the arming input terminal 54 of the phase comparison determinator 56 for actuation by the fault current change detector 58. When used for the residual or ground current network 23 the switch SW1 is in its other position to use the $I_L$ overcurrent network 60 for fault detection.

The relaying network 52 is provided with a current derived signal through the isolating current transformer 61 which will correspond to the one of the isolating current transformer 61 which will correspond to the one of the isolating current transformers 16, 17, 18 or 19, depending upon its connection in FIG. 1. The transformer 61 is provided with a loading resistor whereby the output busses 62 and 63 supply voltage signals to an $I_H$ overcurrent network 64, an $I_L$ overcurrent network 60, a fault detector or current change network 58, a frequency verifier network 65, a breaker open detector 66 and a local squarer network 67. The local squarer network 67 is provided with three output conductors 68, 69 and 70, which transmit square wave signals $I_{SWP}$, $I_{SWN}$ and $I_{SW}$ which are of the same hertz as that supplied by the busses 62 and 63. The signal $I_{SW}$, as will be set forth below, provides an output signal which has a positive square wave portion, which is of the same phase as the voltage wave supplied to the local squarer and which is in phase with and of substantially identical length to the positive half cycle of the input voltage wave. The quantity $I_{SW}$ is supplied to the input terminal 71 of the keyer 72 and, as will be discussed in greater detail below, energizes its output conductor or terminal 73 with a signal which pulsates between a logical 1 and a logical 0 signal in synchronism with the pulsating $I_{SW}$ quantity and is supplied one terminal 73A of a transmitter frequency control network 76.

Under normal non-fault conditions, as will be discussed more fully below, a logical 1 input signal will be supplied by the output terminal 74 of the keyer 72 to the input terminal 74A of the frequency control 76. This control 76 includes two AND networks 75 and 75A. The input terminal 74A is connected to NOT inputs of the two AND networks and to an output terminal 77 while the input terminal 73A is connected to the second NOT input terminal of the AND network 75 and to the normal or non-inverted second input of the AND network 75A. The output of the AND network 75 is connected to a second output terminal 79 while the output of AND network 75A is connected to a third output terminal 80.

The transmitter portion of the transmitter receiver 78 may take any form in which it transmits a signal at any one of three different frequencies depending upon which one of the three input terminals 77A, 79A or 80A is energized with a logical 1 signal. It will be apparent that whenever the input terminal 74A is energized with a logical 1 signal the terminals 77 and 77A will also be energized with a logical 1 signal while each of the terminals 79, 79A, 80 and 80A will be energized with a logical 0 signal irrespective of the energization of the input terminal 73A. Under normal non-fault conditions a logical 1 signal will be present at input terminals 74, 74A, 79 and 79A and the transmitter portion of the transmitter-receiver 78 will transmit a guard signal which as will be discussed in greater detail below will prevent the comparison relay apparatus from tripping except by a high overcurrent as sensed by its associated $I_H$ over-current network. Upon the occurrence of a fault as indicated by the fault responsive network 58, and assuming the presence of a logical 1 output signal from the breaker open detector 66, the output terminal 74 will be energized with a logical 0 signal. When this occurs, the pulsating $I_{SW}$ signal will cause the sets of terminals 79-79A and 80-80A to alternate between logical 1 and logical 0 outputs to provide trip plus or trip positive and trip minus or trip negative frequencies.

Preferably the frequency of the guard signal is outside of the range of the trip signal frequencies and preferably is a frequency less than the frequency of either of the trip signal frequencies. Alternatively the guard and trip signals may comprise coded signals on one or more frequencies. The important element being that the signal frequency or coded signal sent and received will supply the proper information to the receiving station as determined by the conditions at the sending stations. The pulsations of trip plus and trip minus frequencies provide to the receiver at the remote station an exact indication of the current signal applied to the busses 62 and 63. Similarly, upon the occurrence of a fault at the fault detector at the remote station, the remote transmitter will transmit to the local receiver 78 a signal $RI_{SW}$ which is indicative of the current which energizes the remote relaying network. This quantity $RI_{SW}$ is supplied by the receiver portion of the receiver transmitter 78 and transmitted over the conductor 81 to the input terminal 82 and thereby to a non-inverted input terminal of the AND network 82A and to the inverted or NOT input terminal of the AND network 82B of the phase comparison determinator 56. As will be discussed in greater detail below, the quantity $RI_{SW}$ is compared with the quantities $I_{SWP}$ and $I_{SWN}$, furnished by the squarer 67 through the delay timer 84 to the input terminals 85 and 86 and to non-inverted input terminals of the AND networks 82A and 82B of the phase comparison determinator 56. The output terminals of the AND networks 82A and 82B are connected through an OR network 86A to an input terminal 87 of AND network 110.

The delay timer 84 delays the quantities supplied by the squarer 67 for an interval equal to the interval required for the transmitted quantity from the remote station to be received by the local station transmitter-receiver 78. If the comparison of the quantities $RI_{SW}$ and $I_{SWP}$ and $I_{SWn}$ by the AND networks 82A and/or 82B indicate simultaneous inflow or simultaneous outflow of current at the remote and local stations into and out of the protected section of the transmission line, the phase comparison determinator 56 will energize its output terminal 88 (assuming a full arming of the phase comparison determinator AND network 110, as will be described below) to initiate the 4 millisecond timing out of the time delay network 90. When timed out, the time delay network 90 energizes the input terminal 92 of the trip board 94.

Assuming that the $I_L$ overcurrent network 60 is supplying logical 1 output signal to the input terminal 95, the trip board will energize its output terminals 96 and 97. Energization of the output terminal 96 energizes the one of the conductors 25, 26, 27 or 28, depending upon which of the phase current or ground current network the relaying network 52 is embodied in. As set forth above, such an energization of one of the input networks to the tripping network 24 will, in the form of the apparatus shown in FIG. 1, result in the tripping of all of the breakers 10, 11 and 12.

If, however, the phase relationship of the signals $RI_{SW}$ and $I_{SWP}$ and $I_{SWN}$ does not indicate a fault in the transmission line between the local and remote stations, but indicates an external fault, the phase comparison determinator 56, even in the presence of all of its arming quantities, will not energize its output terminal 88, and no energization of the tripping network 24 will occur.

When the guard signal is received by the receiver portion of the transmitter-receiver 78 a logical 1 is supplied by conductor 105, the input terminal 103 of the phase comparison determinator 56 and input terminal 104 of a channel supervision board 106. As is clearly shown in FIG. 3, energization of the input terminal 103 energizes the NOT input terminal 108 of the security circuit means which may take the form of an AND network 110 to remove an arming signal thereto and prevents any energization of the output terminal 88 and of the tripping network 24 by the phase comparison determinator 56.

The output terminal 96 of the trip board 94 may be energized independently of the phase comparison determinator 56 by a logical 1 output from the $I_H$ overcurrent network 64 applied to its input terminal 99. Upon energization of the terminal 99 with a logical 1 signal, the OR network 112 supplies one logical 1 input quantity to the AND network 114. Under the assumed current condition, the $I_L$ overcurrent network 60, which is set to provide its logical 1 output signal at a current magnitude below that at which $I_H$ overcurrent network 64 will also be supplying a logical 1 signal to the input terminal 95 and to the other input terminal of the AND network 114. When so energized, the AND network 114 supplies a logical 1 signal to the time delay network 116, which after a suitable time delay (which is indicated as being from 0.1 millisecond initial time delay when actuated and a 20 millisecond resetting time when deactivated) energizes the output terminals 96 and 97. As indicated above, this results in tripping of the breakers 10, 11 and 12 and the supplying of a logical 1 signal to the input terminal 118 of the keyer 72, which after a 10 millisecond time delay, causes the keyer 72 to energize its output terminal 73 with a logical 1 signal and its output terminal 74 with a logical 0 signal whereby the transmitter frequency control network 77 causes the transmitter-receiver 78 to transmit an intelligence signal to the remote station which represents the quantity $I_{SW}$.

Figure 10:
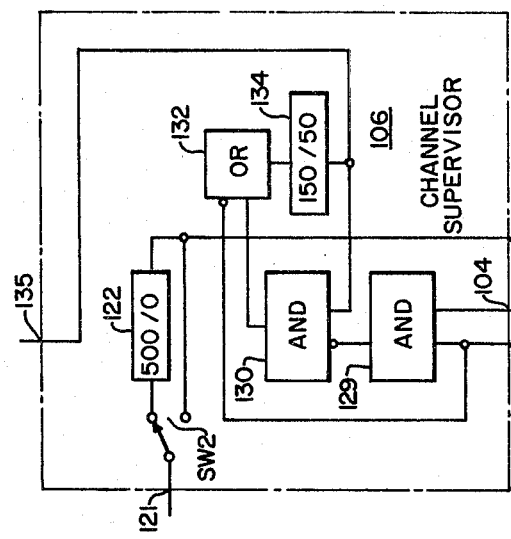
FIG. 10 is a schematic diagram of a channel supervisory board.

In the event of excessive noise in the signal transmitting channel receiver portion of the transmitter-receiver 78, it will energize its output conductor 119, which energizes an input terminal 120 of the channel supervising network 106 (illustrated in greater detail in FIG. 10) to place a logical 1 output signal at the output terminal 121, either substantially instantaneously or after a time delay as determined by the position of the switch SW2 and the time delay afforded by the time delay network 122. The network 122 is illustrated as having a timing period of 500 milliseconds and a substantially instantaneous reset. Energization of the output terminal 121 of the channel supervision board 106 places a logical signal on the input terminal 123 of the phase comparison determinator 56. As indicated in FIG. 3, energization of this input terminal 123 results in a logical 1 energization of the NOT input terminal 124 and removes an arming signal from and prevents the AND network 110 from energizing the output terminal 88.

In the event of the failure of the transmission channel the receiver portion of the transmitter-receiver 78 will fail to maintain a logical 1 output signal on its output conductor 125 and will then place a logical 0 signal thereon. Since the conductor 125 is connected to input terminal 126 of the phase detector 56 and to a non-inverted input terminal 127 of AND network 110 an arming signal is removed therefrom and the detector is rendered ineffective to trip the breakers.

Local tripping is enabled during the initial time period of the channel failure by the combined operation of the channel supervision network 106 and of the channel failure network 140. For this purpose the conductor 125 is also connected to an input terminal 128 of the channel supervision network 106 which in turn is connected to the NOT input of the OR network 132 and to one input terminal of AND network 129. Therefore as soon as the conductor 125 receives the logical 0 signal the output of the OR network 132 supplies a logical 1 signal to the timing network 134 which commences to time out. As indicated this time interval may be 150 milliseconds. The logical 0 signal at the terminal 128 causes the AND network 129 to provide a logical 0 signal to the NOT input terminal of the AND network 130. This is without immediate effect but will subsequently permit the logical 1 output signal provided when the timing network 134 times out to cause the AND network 130 to supply a logical 1 signal to the non-inverted terminal of the OR network 132 and cause the OR network to maintain the timing network 134 in its timed out condition.

The output terminal 135 of the board 106 is connected to the input terminal of the channel failure unblock network or board 140 and to the NOT input terminal of OR network 142. During normal channel operation and prior to the timing out of network 134 the logical 0 signal applied causes the OR network 142 to provide one arming signal to the AND network 146. A second arming signal is applied to the AND network 146 from the $I_L$ overcurrent network 60 which normally supplies a logical 1 signal to the input terminal 153.

A third arming signal is supplied to the NOT input terminal of the AND network 146 through the input terminal 152 from the guard signal output bus 105. Prior to loss of channel or the loss of signal it is maintained at a logical 1 condition and the AND network 146 is disarmed. When there is a loss of channel and the bus 105 receives the logical 0 signal the NOT input terminal of AND network provides the missing arming signal and the AND network will respond to any logical 1 signal supplied to the input terminal 145 from the fault detector 58. This condition lasts only until the timing network 134 times out and the resulting logical 1 signal is supplied to the NOT input terminal of the OR network 142 to remove the arming signal formerly supplied thereby to the AND network 146. Thereafter the local breakers may be tripped by the network 52 solely by its $I_H$ overcurrent network 64.

When the AND network 146 is fully armed and a fault occurs, the logical 1 output signal from the fault detector 58 causes the AND network to initiate the timing out of the timing network 141. When timed out the network 141 energizes the output terminal 147 with a logical 1 signal. The terminal 147 is connected to terminal 148 of the trip board 94 and to one input terminal of OR network 112. Therefore the timing out of the timing network 141 results in the tripping of the breakers 10, 11 and 12 in the manner set forth above.

The channel supervision board 106 is reset when logical 1 signals are applied to its terminals 104 and 128 by the conductors 105 and 125 from the transmitter-receiver 78. The logical 1 signals applied to both input terminals of the AND network 129 cause the AND network 130 to remove the logical 1 signal from the non-inverted input terminal of the OR network 132 and the logical 1 signal, as the NOT input terminal of the OR network 132 removes its logical 1 output signal and permits the timing network 134 to time out its resetting time interval which is indicated as being 30 milliseconds. If the normal transmission persists for this time period a logical 0 signal will be present at the terminals 135, 136 and 138. This re-establishes the arming signals at the AND networks 110 and 146 which were removed by the failure of the transmitting channel.

The apparatus so far described is particularly adapted for power line carrier channel transmission wherein the channel can fail during faulting of the power line more readily than with independent transmitting channels such as microwave or leased telephone wires. In some instances therefore, it may be desirable to omit the channel failure unblock network 140. As will be apparent the only output signal from this network 140 is to the input terminal 148 of the trip board 94. The OR network 112 continues to be under control of the phase comparison detector 56 at input terminal 92 and of the $I_H$ overcurrent network 64 at input terminal 95.

Under normal operating conditions the breakers associated with the protected line section at the local and the remote stations will be closed and current will be flowing through the line section. In the absence of a fault, each transmitter-receiver will transmit a guard signal to the other transmitter-receiver which will prevent the opposite phase comparison detector from operation in response to a fault signal from its fault detector. If the local breaker is open, the remote breaker is closed and the phase conductor is faulted, the fault detector of the relaying network 52 at the remote station will supply a logical 1 signal to its phase comparison determinator, however the input terminal 108 of its AND network 110 will be energized with a logical 1 signal from the relaying network 52 at the local station which cannot "see" the fault because of the open breaker. The AND network 110 at the remote station cannot under these conditions energize its output terminal 88 and unless the fault current is high enough to actuate the $I_H$ overcurrent network 64 of the remote network 52, the remote breaker will not be opened and interrupt the fault current.

Figure 7:
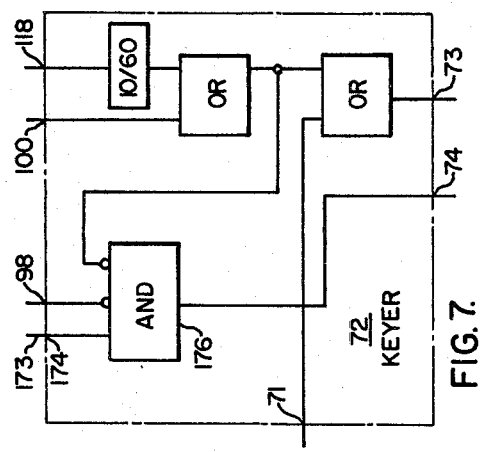
FIG. 7 is a schematic diagram of a keyer network.
Figure 12:
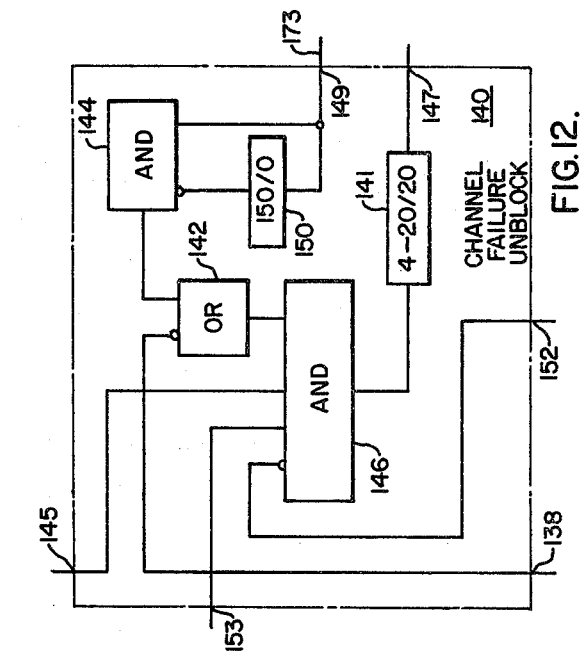
FIG. 12 is a schematic diagram of the channel failure unblock network.

In order to permit the removal of the guard signal and allow the remote breaker to be opened, the network 52 is provided with a breaker open detector 66 which when the local breaker is open will remove the normal logical 1 signal on its output conductor and substitute a logical 0 signal. This logical 0 signal is supplied to the input terminal 174 of the keyer network 72. As may be seen in FIG. 7, the logical 0 signal at the non-inverted input terminal of the AND network 176 disarms it removing its logical 1 output signal normally supplied by output terminal 74 to the input terminal 74A of the transmitter frequency control network 76. As discussed above the removal of the logical 1 signal to terminal 74A removes the logical 1 signal at output terminal 77 and permits the AND networks 75 and 75A to alternatingly apply logical 1 signals to the output terminals 79 and 80.

Therefore when the breaker is open at the local station, the guard signal to the remote station is interrupted and because no current is flowing to energize the local current transformer 61 only the AND network 75 is effective to drive the local transmitter-receiver 78 and a trip negative signal will be transmitted continuously to the network 52 of the remote station. This trip negative signal at the remote station will enable its phase comparing AND network 82A to enable the remote AND network 110 to respond to the fault signal from the remote fault detector 58.

When the open breaker is closed, the logical 1 signal is again supplied to the conductor 172 and to the keyer network 72 to rearm its AND network 176 and reestablish the transmission of the guard signal. The conductor 173 is also connected to input terminal 149 of the channel failure unblock network 140 and initiates the application of a logical 1 input signal to the input terminal of the timing network 150 and to the non-inverted input terminal of AND network 144. During the timing period of the network 150, indicated as being 150 milliseconds, it will provide a logical 0 signal to the NOT input terminal of AND network 144. Therefore, for the 150 milliseconds interval subsequent to initial closure of the breaker the AND network 144 will transmit a logical 1 signal to the OR network 142 to arm the AND network 146 independently of the signal supplied to its input terminal 138 from the channel supervision board 106 so that the channel failure unblock board 140 will respond to the associated fault detector 58 and in the event the line is faulted supply the associated trip board 94 with a logical 1 signal in the absence of a signal from the channel supplying the associated transmitter receiver 78 and the consequent presence of a logical 1 signal at its input terminal 138 from the channel supervision board 106. It should be noted that with loss of channel there will be no received guard signal and a logical 0 signal will be supplied to terminal 138 to provide an arming signal at the NOT input terminal of AND network 146.

A preferred form of squarer 67 is illustrated in FIG. 5 and is provided with input terminals 154 and 155 which are connected to the busses 62 and 63. These input terminals are connected to the input terminals of a first operational amplifier, the output of which is connected to energize a second operational amplifier 158, the output of which is connected through a transistor 159 to provide a square wave pulsing signal at terminal 160 which is of substantially equal length to, and in phase with, the negative half cycle of the input signal applied to the input terminals 154 and 155. The terminal 160 is connected to the NOT input terminal of a single input OR network 161, the output of which connects with the conductor 70. The conduction and non-conduction of transistor 159 causes the OR network 161 to energize the output terminal 70 with alternating logical 1 and logical 0 input signals which drive the keyer 72 whereby alternating logical 1 and logical 0 are supplied to the input terminal 73A of the transmitter frequency control 76. The second amplifier 158 will drive the transistor 159 at a much lower threshold magnitude of the voltage quantity on the busses 62 and 63 so that the logical 1 and logical 0 output signals are almost identical to the half cycle period of this voltage quantity.

The amplifier 156 is connected to drive a pair of transistors 159A and 159B and render them alternatively conductive in response to the voltage alterations of its output signal. The transistor 159A supplies logical 0 and logical 1 signals to the OR network 161A to cause the output terminal 68 to provide logical 1 and logical 0 output signals to provide the $I_{SWP}$ output. A transistor 159C is rendered conducting and non-conducting in opposite phase to the transistor 159A by the transistor 159B and drives the OR network 161B to cause logical 1 and logical 0 output signals at the output terminal 69 to provide the $I_{SWN}$ output. The length of the logical 1 output signal of the OR networks 161A and 161B may be of slightly less duration than the positive and negative half cycle of the voltage quantity at the busses 62 and 63 but preferably not less than 87° thereof at 60 hertz and 0.2 volts RMS between the busses 62 and 63.

The breaker open detector more fully shown in FIG. 6 is actuated by the signals developed at terminal 160 of the squarer 67. For this purpose the terminal 160 is connected by the conductor 162 to the input terminal 163 of the breaker open detector 66. The breaker open detector compares the time intervals of the logical 1 and logical 0 output signals at the terminal 160. The logical 1 signal at terminal 160 occurs during the absence of a positive potential pulse at the busses 62 and 63 and a logical 0 signal occurs during the interval between the positive potential pulses. With a a 60 hertz energization the pulses are slightly longer than 8 milliseconds. If the time interval between these positive pulses is substantially longer than 8 milliseconds, as for example 20 milliseconds, it may be assumed that the breaker is open and the transformer 61 is deenergized. With a 60 hertz alternating voltage quantity, the timing network may be set to time out in 6 milliseconds. Therefore, as long as the 60 hertz voltage quantity is maintained (indicative of a closed breaker) each positive half cycle will time out the timer and maintain a 20 millisecond timing out period and maintain a logical 1 output signal on conductor 173. If, however, the breaker is open no positive pulses will time out the 6 milliseconds and the 20 millisecond timer will time out and a logical 0 signal will be supplied to the conductor 173.

More specifically, the detector 66 includes a resistor capacitor timing network 164 (FIG. 6) which is energized to time out its 6 millisecond timing interval when the transistor 165 is non-conducting and a logical 1 signal is at terminal 160 and which is substantially instantaneously reset when the transistor 165 is rendered conducting by the logical 0 input signal to the input terminal 163. At the end of its predetermined timing period, the capacitor of the RC network 164 will have charged sufficiently to break-over the Zener diode 166, and base current will flow and cause the transistor 167 to conduct. Conduction of the transistor 167 causes the capacitor 168 to discharge through resistor 169 and thereby time out is 20 millisecond interval. At the end of the 20 millisecond interval, the charge on the capacitor 168 will be reduced below the break-over voltage of the Zener diode 170, and the flow of base current to the base of transistor 171 will be removed. When transistor 171 becomes non-conducting the potential of the output terminal 172 goes from substantially that of the zero voltage bus to substantially that of the 15 volt bus and provides the logical 0 open breaker signal. With the breaker closed, the capacitor 168 will be periodically charged and maintained at a potential above that necessary to break-over the Zener diode 170 so that the transistor 171 will be maintained conducting as long as the breaker is closed.

The frequency verifier block network 192 acts to disarm the AND network 110 and prevent tripping of the breaker due to any high frequency current transients flowing through the associated current transformers. The frequency verifier drive network 65 filters out the low frequency offset in the output of the current transformers to permit the superimposed alternating signal to be supplied to the frequency verifier blocking network 192. For this purpose the network 65 includes a high pass filter network comprised of first and second operational amplifiers 186 and 187. The output of the operational amplifier 187 is connected to control the conductivity of a transistor 188, which in turn, controls a second transistor 189. The high pass filter of the frequency verifier network filters out any low frequency or direct current offset component which may be present in the output of the current transformer 61 to provide an output signal at its output terminal 190 each time the filtered signal goes positive. It will be appreciated that its output will be substantially square wave in substantial synchronism with the filtered wave and it is really immaterial whether it is in phase therewith or 180° out of phase. During normal operation, no D.C. or low frequency offset or high frequency transients of a troublesome nature will normally be present, but such may occur as for example when a fault occurs or following reclosure of a breaker in the system. The output terminal 190 of the frequncy verifier drive network 65 is connected to the input terminal 191 of the frequency verifier blocking network 192, and causes the transistor 193 thereof to conduct in response to a positive or logical 1 output signal at the terminal 191 and to be non-conducting at a logical 0 output signal. Each time the transistor 193 changes its conductive state, one of the input terminals of the AND network 194 is momentarily placed in a logical 0 condition, whereby the NOT output circuit of the AND network 194 will momentarily provide a logical 1 pulse to the S input terminal of flip-flop 196 and the upper terminal 197 of AND network 198 to the NOT input terminal 199 of the timer 200. Each time that a logical 1 signal is applied to the S input terminal of the flip-flop 196, it flips to provide a logical 1 signal through the 20 microsecond timer 202 to the other input terminal 204 of the AND network 198. This causes a logical 1 signal to be supplied from the output terminal 205 of the AND network 198 to the S input terminal of a second flip-flop 206. This flips the flip-flop 206 and it provides a logical 1 output signal at its 1 terminal and to the input terminal of the timing network 208. Shortly after the change in state of the transistor 193, the logical signal will reappear at both input terminals of the AND network 194. When this occurs its NOT output will supply a logical 0 signal to the NOT input 199 of the timing network 200 which commences to time out its desired timing periods which may be 5 milliseconds after the logical 0 signal was applied to its NOT input 199. When the network 200 times out it provides a logical 1 signal at its output terminal. This terminal is connected to the R input terminal of the flip-flops 196 and 206. If this occurs before the next zero crossing reset of the alternating voltage signal on the busses 62 and 63, the resulting logical 1 output signal of the timing network 200 will reset the flip-flop 196. Under these conditions the sequential zero crossings will merely cause the flip-flop 196 to flip and flop without any actuation of the flip-flop 206 since the AND network 198 always maintains a logical 0 input signal to the S terminal of the flip-flop 206 and the flip-flop continually maintains a logical 0 output signal to the timing network 208 which in turn remains timed out and supplies the logical 0 arming signal to the output terminal 210. This terminal is connected by a conductor 211 to the input terminal 212 of the phase comparison determinator 56. As will be seen in FIG. 3, this terminal is connected to a NOT input terminal 213 of the AND network 110. Therefore as long as the timing network 208 remains timed out with a logical 0 output signal an arming signal is maintained at input terminal 213.

If, however, a second change of state occurs prior to the timing interval of the network 200 indicative of a higher hertz, the AND network 194 will momentarily apply a logical 1 signal to the NOT input 199 of the timer 200 and to the input terminal 197 of the AND network 198 while the flip-flop 196 is still in its stage to provide a logical 1 signal to the AND network input terminal 204. This results in a logical 1 signal being supplied by the AND network 198 to the S input terminal of flip-flop 206 and its flipping to provide a logical 1 output signal to the timing network 208. The network 208 is illustrated as having no timing out period and a logical 1 signal substantially immediately appears at the terminal 210 and the arming signal provided by the NOT input terminal 213 of the AND network 110 will be removed and the consequent rendering of the determinator 58 ineffective to trip the associated breakers. This logical 1 signal will remain until the reappearance of the lower frequency signal which is composed of whole cycles which are equal to or greater than the delay setting of the timer 200. With a 5 M.S. setting this threshold frequency will be approximately 100 Hz.

The timing network 200 is reset by the momentary logical 1 signal which is supplied to the NOT input of the timer 200. It is reset substantially instantaneously as indicated by the zero under the slant line and when the logical 0 signal is returned to the NOT input it restarts its 6 millisecond interval. The 20 microsecond timer 202 together with the operating time of the flip-flop 196 provide a delay in the transmission of the logic 1 output signal from AND network 194 greater than the interval that the logical 1 signal is supplied by the AND network 194 due to a change in state of the transistor 193. Therefore unless the timer 200 has failed to reset the flip-flop 196, the momentary logical 1 output signals of the AND network 194 are prevented from actuating the AND network 198.

A preferred form of fault detector 58 is illustrated in single line diagrammatic form in FIG. 4. This detector detects a sudden discontinuity in an alternating wave and is more completely shown and described in U.S. Pat. No. 3,654,516. Basically it comprises an integrating circuit and a differentiating circuit. The intergrating circuit multiplies the integral by $\omega^2$; $\omega$ being equal to the frequency in cycles per second (herein 60) multiplied by $2\pi$. As set forth in said patent the weighed integral quantity is added to the differential quantity. When the waveshape suddenly changes due to a sudden change in the applied alternating quantity the weighed integral quantity and the differential quantity are no longer equal and the adder provides an output quantity to the transient detector which thereupon provides a logical 1 output to the time delay network 58A.

Figure 19:
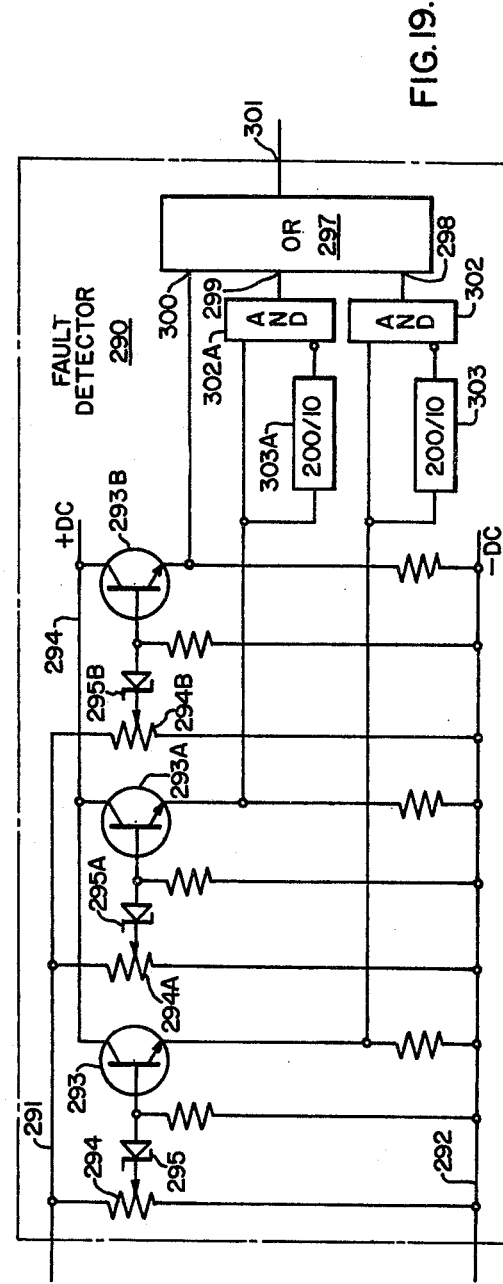
FIG. 19 is a schematic illustration of a modified fault detector.

A modified form of fault detector 290 is shown in FIG. 19 and under some conditions wherein current magnitude is of primary importance may be substituted for the change of current type of detector 58. The fault detector 290 is particularly desirable to allow more sensitive overcurrent arming in the rare case of the very long line or high source impedance of extremely variable source impedance (such as during the first few years of a multi-unit remote generating station while the units are being added) whereby arming can occur at different current levels. In the case of a relatively low fault current where it is not as necessary to interrupt the fault current immediately as it is at higher levels of fault current; the low level fault current portion of the fault detector is provided with timing devices to trip at such lower levels only after the fault current has existed for a predetermined time interval rather than as rapidly as possible. As shown in FIG. 19, the fault detector 290 is provided with three fault detecting networks which individually include the element of potentiometers 294, 294A and 294B and a resistor connected between the input bus 291 and the common negative D.C. bus 292. Each of the networks includes individually a transistor 293, 293A and 293B connected between a positive D.C. bus 294 and the common negative D.C. bus 292. The base of the transistor 293 is connected through a Zener diode 295 to the movable arm of the potentiometer 294. Adjustment of its movable arm determines the magnitude of the input quantity which causes the Zener diode 295 to break-over and the transistor 293 conduct. Similarly, the potentiometers 294A and 294B control the magnitude of the input quantity at which the Zener diodes 295A and 295B conduct and render the transistors 293A and 293B conductive.

The fault detector 290 includes an OR network 297 having a plurality of input terminals 298, 299 and 300 and an output terminal 301. The potential generated across the emitter resistor of the three transistors 293, 293A and 293B are respectively and individually connected to the input terminals 298, 299 and 300. A time delaying device is associated in the connection to each of the input terminals 298 and 299. As shown, the delaying devices include an AND network 302 and 302A having output terminals directly and individually connected to the input terminals 298 and 299 respectively of the OR network 297. The AND networks include a non-inverted input terminal and a NOT input terminal. The NOT input terminals of the AND networks 302 and 302A are connected to the emitters of the transistors 293 and 293A through time delay networks 303 and 303A respectively. The non-inverted input terminals of the AND networks 302 and 302A are also connected to the emitters of the transistors 293 and 293A respectively. When the associated transistor 293 or 293A conducts a logical 1 signal it is applied to the non-inverted input of the respective AND network 302 or 302A and a time delayed logical 1 signal to the NOT input, terminal thereto, the duration of the delay being determined by the time delay network 303 or 303A. As soon as the delay network times out, which time interval is indicated as being 200 milliseconds, the logical 1 output signal of the AND network disappears. If during the time delay period, the phase comparison signal does not indicate an internal fault the arming signal due to the conduction of the transistor 293 and 293A will disappear and will not again be unless the magnitude of the input quantity drops to cause the transistor 293 or 293A as the case may be for the 10 millisecond reset timing interval of the timing network 303 or 303A. In the case of the conduction of the transistor 293B, no time delay network is involved and the input terminal 300 will remain at a logical 1 and maintain a logical 1 arming signal at the output 301 as long as the current level remains sufficiently high to maintain the transistor 293B conducting.

Figure 9:
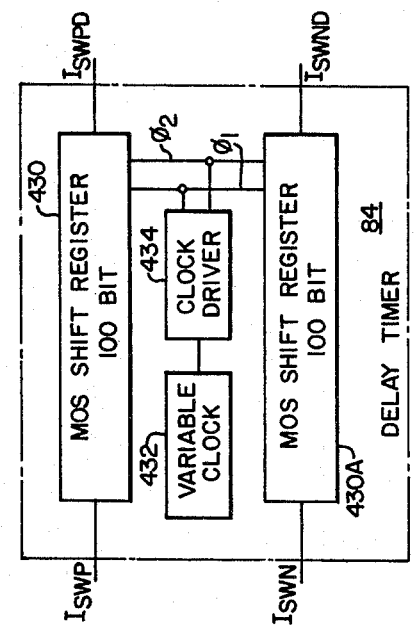
FIG. 9 is a schematic diagram of a local delay timer.
Figure 11:
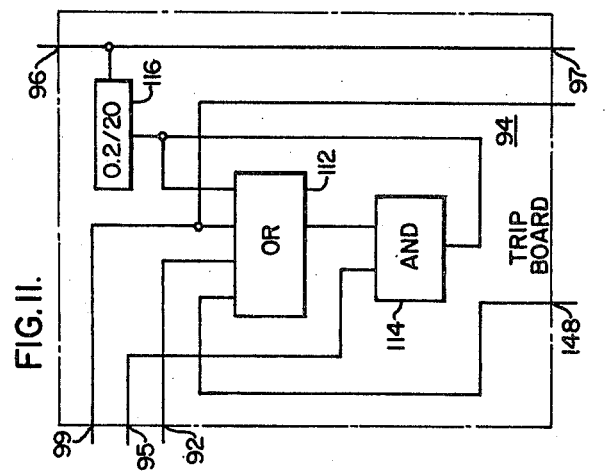
FIG. 11 is a schematic diagram of the trip board.

A suitable delay timer for the delay network 84 is schematically illustrated in FIG. 9. This delay timer 84 comprises a pair of shift registers which may be for example 100 bit registers 430 and 430A. An adjustable frequency output clock 432 and a clock driver 434 provide the $\phi_1$ and $\phi_2$ signals to drive the registers. The $I_{SWP}$ input square wave from squarer terminal is supplied to the input of the shift register 430 while the $I_{SWN}$ input signal is supplied to the input of the shift register 430A. The shift registers sample their inputs at the clock frequency and when each new sample is taken by the registers, the preceding samples are shifted toward the output. The output signals $I_{SWPD}$ and $I_{SWND}$ will be duplicates of the input signals $I_{SWP}$ and $I_{SWN}$ respectively but delayed with respect thereto in time by the interval required for a sample to be moved the 100 bit shift of the respective register. The shift registers may be for example similar to a Texas Instrument dual 100 bit shift register TMS3003LR.

The clock frequency should be high at all times with respect to the $I_{SWP}$ and $I_{SWN}$ signals to maintain the $I_{SWPD}$ and $I_{SWND}$ signals as a delayed duplication of the $I_{SWP}$ and $I_{SWN}$ signals. The clock frequency is adjustable to provide the required delay as set forth above.

Figure 13:
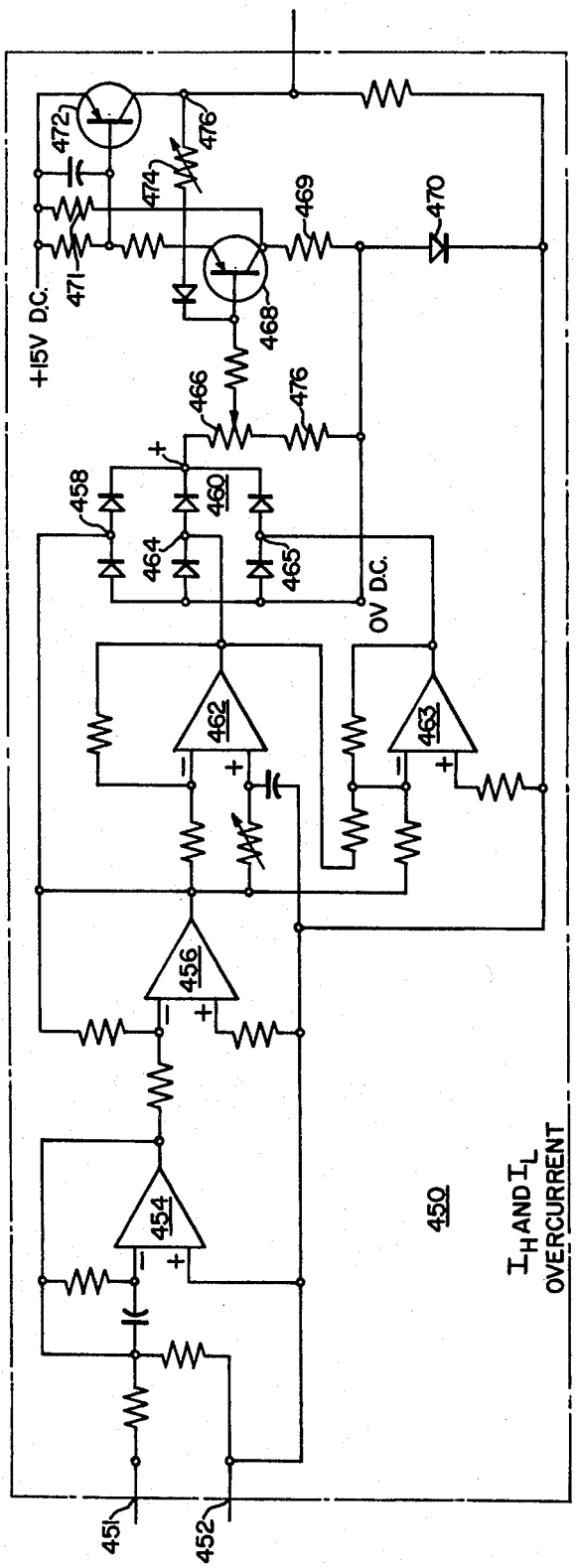
FIG. 13 is a schematic representation of an overcurrent network which may be used for either the low or high current networks.
Figure 15:
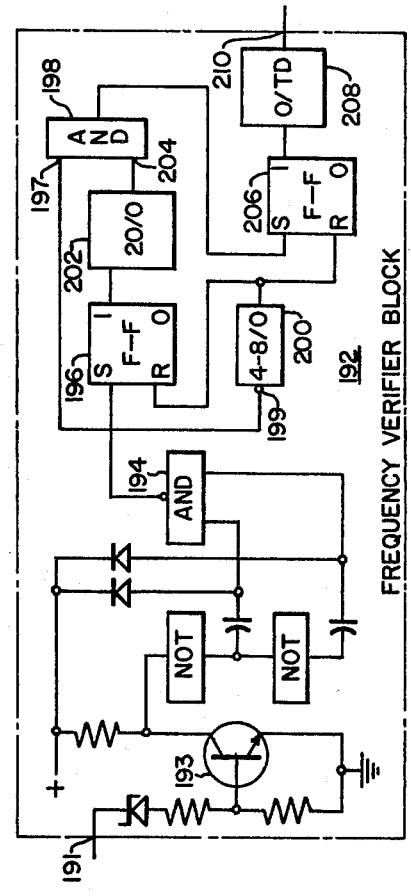
FIG. 15 is a schematic diagram of a frequency verifier blocking network.
Figure 14:
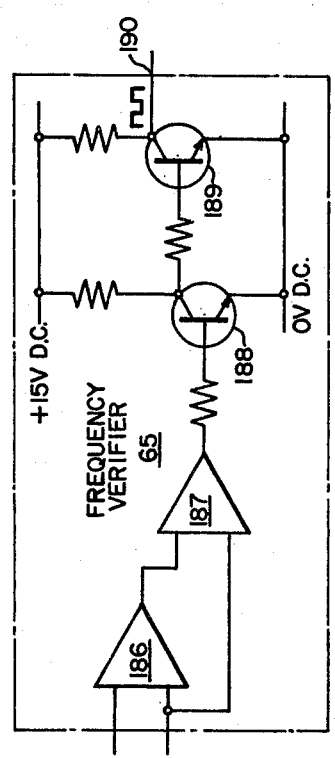
FIG. 14 is a frequency verifier network.

A suitable overcurrent network 450 for use as the networks 60 and 64 is schematically set forth in FIG. 13. It comprises a pair of input terminals 451 and 452 which are energized by the output quantity on the busses 62 and 63 which are connected to the input terminals of an operational amplifier 454 through the usual network. The output drives a second operational amplifier 456. The output of this amplifier is supplied to one input terminal 458 of a polyphase rectifier 460 and to first and second operational amplifiers 462 and 463 are programmed to provide phase displaced output quantities to the input terminals 464 and 465 respectively. The input network to the amplifier causes it to shift the input voltage by 60° leading and the amplifier inserts this voltage so that the output voltage will be 120° lagging its input voltage. The input network programs the amplifier 463 to add the output voltages of the amplifiers 456 and 462 and the amplifier inserts this added sum whereby the output of the amplifier 463 is phase displaced to lead the input voltage at the output of amplifiers 462 by 120°.

The rectified output of the rectifier 460 is applied across a series circuit comprising the resistive element of a potentiometer 466 connected to the positive output terminal and a resistor 467 connected to the negative terminal. The movable arm of the potentiometers 466 is connected to the base of a transistor 468, the emitter of which is connected through an emitter resistor 469 to the common connection of the resistor 467 and the negative output terminal. The diode 470 isolates the negative terminal of the rectifier 460 from the ground bus 471.

A voltage dividing network comprising resistors 469 and 471 is connected between the 30 15V D.C. bus and the grounded 0V D.C. bus 471 to maintain the emitter potential of the transistor at a desired potential above that of the ground bus 471. When the potential at the arm of the potentiometer 466 exceeds the preset value at the emitter of transistor 468 as determined by the voltage dividing resistors 469 and 471, the transistor 468 conducts. This causes the transistor 472 to conduct through the variable resistor 474 to cause the transistor 468 to remain conducting even though the output voltage of the rectifier 460 decreases somewhat. The magnitude of the resistance of the resistor 474 will determine the drop in output voltage required to return the transistor 468 to its non-conducting condition.

It will be evident from the foregoing that the potentiometer 466 may be adjusted to determine the magnitude of the input quantity at the input terminals 451 and 452 which will cause the conduction of the transistor 468 and the application of a logical 1 output signal and its output terminal 476. The $I_L$ networks 60 of the phase current responsive networks 20–23 are set to provide a logical 1 output signal to the input terminal 182 of the discriminator 58 and arming terminal 183 of the AND network thereof at current magnitudes in the phase conductor somewhat above the charging current magnitude thereof. The networks $I_L$ of the residual or ground current responsive network 23 may be set at any given desired value of ground fault current at which the breakers should be opened. The $I_H$ networks 64 are set to provide a logical 1 signal at a current which should not be exceeded and at a value greater than any power current which the line is programmed to carry. Since the $I_L$ networks 60 will always be set to provide a logical 1 signal at a lower current value than the $I_H$ networks 64, the AND network 114 of the trip board 94 wll be armed and therefore a logical 1 output signal from the $I_H$ networks always causes the board 94 to energize the tripping network 24 and trip at least one of the breakers 10, 11, 12; all will be tripped with the network 24 illustrated in FIG. 1.

Under normal operation conditions the AND networks 110 of the determinators 56 have their input terminals 213, 127, 124, 137 and 183 armed as described. Since the remote station is transmitting a guard signal a logical 1 signal and terminal 108 will not be armed. Under non-fault current conditions the fault detectors 58 supply a logical 0 signal to the input terminal 54 and the input terminal 54A of the AND network 110 and the input terminal 82 will be supplied with logical 0 signal whereby the AND network 82B will have one of its input terminals in its enabling condition. The $I_{SWPD}$ and the $I_{SWND}$ signals will be supplied from the squarer network 67 and the delay timers 84 to the input terminals 85 and 86 respectively. The AND network 82B will be actuated each negative half cycle of the quantity on the busses 62 and 63 to periodically supply logical 1 signals to the input terminal 87 of its associated AND network 110. The AND networks 110 are prevented from energizing their outputs 88 due to the absence of logical 1 signals from the fault detectors 58 and the absence of the arming signal at terminal 108.

Assuming a fault current sufficient to cause one or more $I_H$ overcurrent networks to supply a logical 1 output signal the associated trip board or boards 94 will supply logical 1 output signals to the tripping network 24 and the breakers 10, 11 and 12 tripped as set forth above. If a phase fault current occurs of a magnitude less than full load current the associated fault detector 58 will supply a logical 1 signal to the associated AND network 110. In the case of the ground current network the switch SW1 will cause this signal to be supplied from the $I_L$ network 60 of the network 23. This logical 1 signal is also supplied to the input terminal 98 of the keyer 72. Prior to the fault a logical 1 signal was supplied to terminal 174 from the breaker open network 66 (indicative of a closed breaker) and a logical 0 signal was supplied to the NOT input terminal connected thereto, the logical 0 signal from the fault detector 58 maintained a logical 1 signal on the transmitter frequency control 76 and the transmitter portion of the transmitter-receiver transmitting a guard signal. When the fault occurred and the logical 1 signal applied to the keyer terminal 98 one of the enabling signal on the AND network 176 was removed from and a logical 0 signal was supplied to the terminal 74A of the transmitter frequency control 76 and the transmission of the guard signal ceases and transmission of the pulsing $I_{SW}$ signal commences since the input terminal 73A will be supplied with a pulsating logical 1 signal from the squarer output terminal 70 through the OR network and output terminal 73 of the keyer 72.

The relaying apparatus at the remote end of the line section also was actuated to terminate the transmission of its guard signal and to initiate the termination of its $I_{SW}$ signal. The termination of the remote guard signal causes the local transmitter-receiver 78 to remove the logical 1 signal from the conductor 105 thereby arming the terminal 108. The transmission of the remote $I_{SW}$ signal causes the local transmitter-receiver 78 to initiate the energization of conductor with the $RI_{SW}$ signal which is supplied to the AND networks 82A and 82B.

These networks 82A and 82B are already being supplied with the $I_{SWPD}$ and the $I_{SWND}$ signals from the squarer 67 through the delay timer 84 as set forth. If the fault is internal to the protected line section, the relative phase of the quantities $I_S WPD$ and $I_{SWND}$ with respect to the quantity $RI_{SW}$ will be such that both AND networks 82A and 82B will be enabled to place an arming signal at terminal 87 for at least the 4 millisecond timing interval of the timing network 90. Therefore since a logical 1 signal is being supplied to terminal 54A, the AND network is now conditioned to provide a logical 1 signal at terminal 88 to initiate the timing interval (4 milliseconds as indicated) of the timing network 90. At the end of this 4 millisecond interval, a logical 1 signal is transmitted to the input terminal 92 of the trip board 94. This signal actuates the OR network 112 and enables the AND network 114 to supply a logical 1 trip signal to the tripping network to trip the breakers 10, 11 and 12.

If the fault were external to the protected section, the phase of the quantities $I_{SWPD}$ and $I_{SWND}$ with respect to the quantity $RI_{SW}$ sould be such that the AND networks 82A and 82B would not be armed and supply an arming signal to terminal 88 for an interval sufficient to time out the timing network 90. It should be noted that each time the logical 1 signal is removed from the input to timing network 90 it substantially instantaneously resets so that the network 90 always requires a continuous logical signal for its full 4 millisecond interval in order to have a logical 1 output signal. Therefore, for an external fault the breakers 10, 11 and 12 will not be tripped.

In the event the transmitter-receiver 78 fails to properly energize its output terminal due for example to the failure of the tramsmitting channel, the conductor will be energized with a logical 0 signal and the terminal 108 of the AND network 110 will be armed in spite of the non-faulted condition of the line section. This is an undersirable operating condition and could result in the false opening of the breaker by a transient or false signal to the terminals 54 and 54A. The phase comparison detector remains effective to trip by a fault detector signal for the 150 millisecond timing period of timing network 134 as described. Thereafter, the network 52 is ineffective to trip the breakers except by the $I_L$ network logical 1 signal or described in greater detail above.

As stated in connection with the description of the frequency verifier and frequency verifier block networks 65 and 192, false operation due to a high frequency transient quantity on the phase conductors will be prevented by a disarming of the arming terminal 213 of AND network 110. As stated the disarming of the AND network 176 of the keyer 72 places a logical 0 signal on the input terminal 74A to prevent the transmission of the guard signal as described, above in connection with the description of the breaker open detector 66, the operation of the remote breakers is not prevented by the locally transmitted guard signal which would otherwise occur. This transmission of the guard signal is interrupted by the disarming of the AND network 176 when a logical 0 signal is provided by the detector 66.

Figure 16:
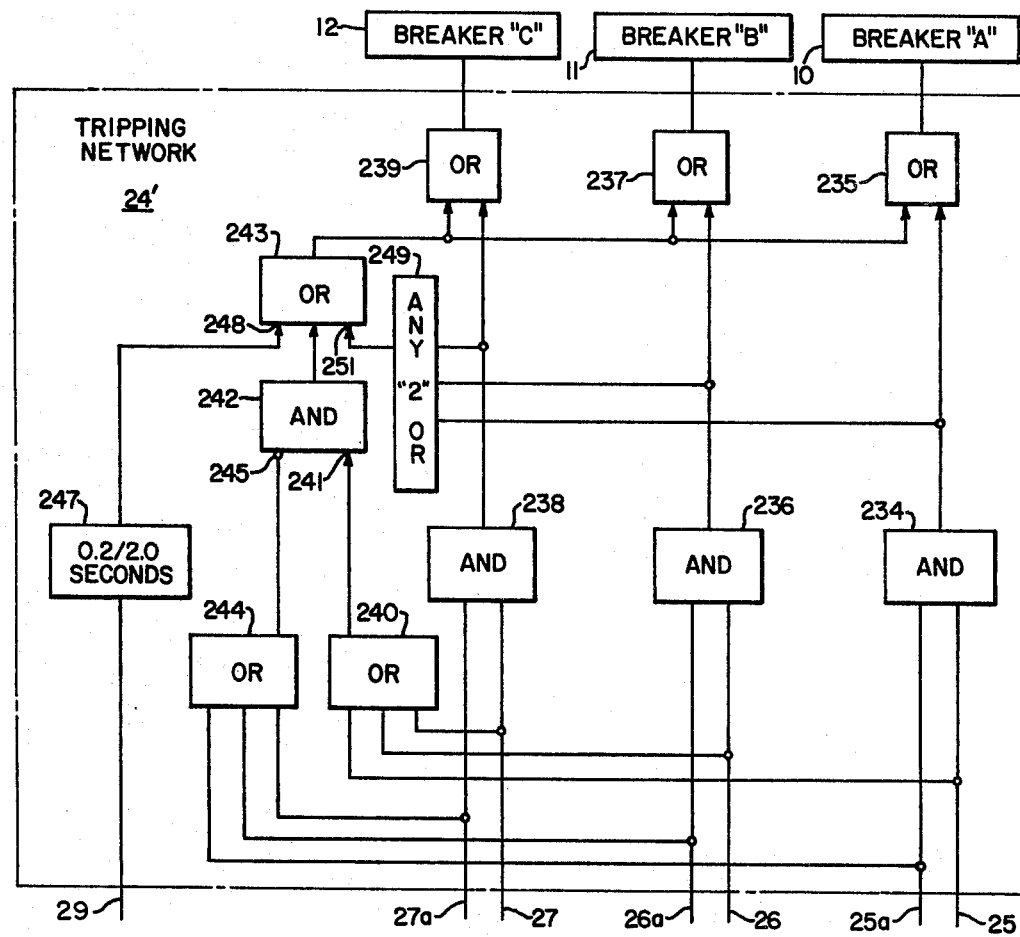
FIG. 16 is a schematic diagram of a modified form of tripping network.

FIG. 16 shows a modified form of tripping network 24' wherein the breakers 10, 11 and 12 may be selectively opened depending upon the type of fault. The network 24' utilizes the logical signals at the output terminal 54B of the detector 56. These arming signals are applied by the conductors illustrated in FIGS. 1 and 16 by the reference characters 25a, 26a and 27a. These signals are coupled with the respective tripping output signals appearing on the conductors 25, 26 and 27 at the AND networks 234, 236 and 238 to provide individual tripping signals through OR networks 235, 237 and 239 to the breakers 10, 11 and 12 respectively for individual tripping thereof.

The fault signal conducting conductors 25, 26 and 27 are also connected to input terminals of a first OR network 240, the output of which is connected to the normal input terminal 241 of an AND network 242. Similarly, the arming conductors 25a, 26a and 27a are connected to the input terminals of a second OR network 244, the output of which is connected to the NOT input terminal 245 of the AND network 242. The output of the AND network 242 is connected to one input terminal of an OR network 243. The output of the OR network 243 is connected to one input terminal of each of the OR networks 235, 237 and 239. In the event the trip board 94 supplies a logical 1 output signal to the associated one of the conductors 25, 26 or 27 depending upon which network 25, 26 or 27 is actuated and for some reason or other a logical 0 signal is present on the comparison conductor 25a, 26a or 27a and the AND networks 234, 236 and 238 cannot actuate the individual breaker 10, 11 or 12, the OR networks 240 and 241 will enable the AND network 242. The resulting logical 1 signal from the AND network 242 will act through the OR network 243 and the OR networks 235, 237 and 239 to trip all of the breakers 10, 11 and 12.

The fault signal input conductor 29 from the residual network 23 is connected through a timing network 247 to one input terminal 248 of the OR network 243. The output terminal of the ANY-2 OR network 249 is connected to a third input terminal 251 of the OR network 243. The three input terminals of the ANY-2 OR network 249 are individually connected to the output terminals of the AND networks 234, 236 and 238. The ANY-2 OR network 249 is described in detail in FIG. 18. In essence the network 249 will provide a logical 1 output signal whenever logical 1 signals appear at two or more of its input terminals. It will be apparent that in the presence of at least two arming signals, the AND networks 234, 236 and 238, the ANY-2 OR networks 249 will cause the OR network to furnish logical 1 signals to all of the OR networks 235, 237 and 239 and trip all the breakers 10, 11 and 12. Also, if for some reason or other there is a remainder or ground fault current and none of the breakers 10, 11 and 12 are tripped by their respective AND networks 234, 236 and 238 and if this condition persists, for the timing out period of the timing network 247, the network 247 will energize the OR network 243 and cause all of the breakers 10, 11 and 12 to trip and interrupt the residual or ground fault current.

Figure 17:
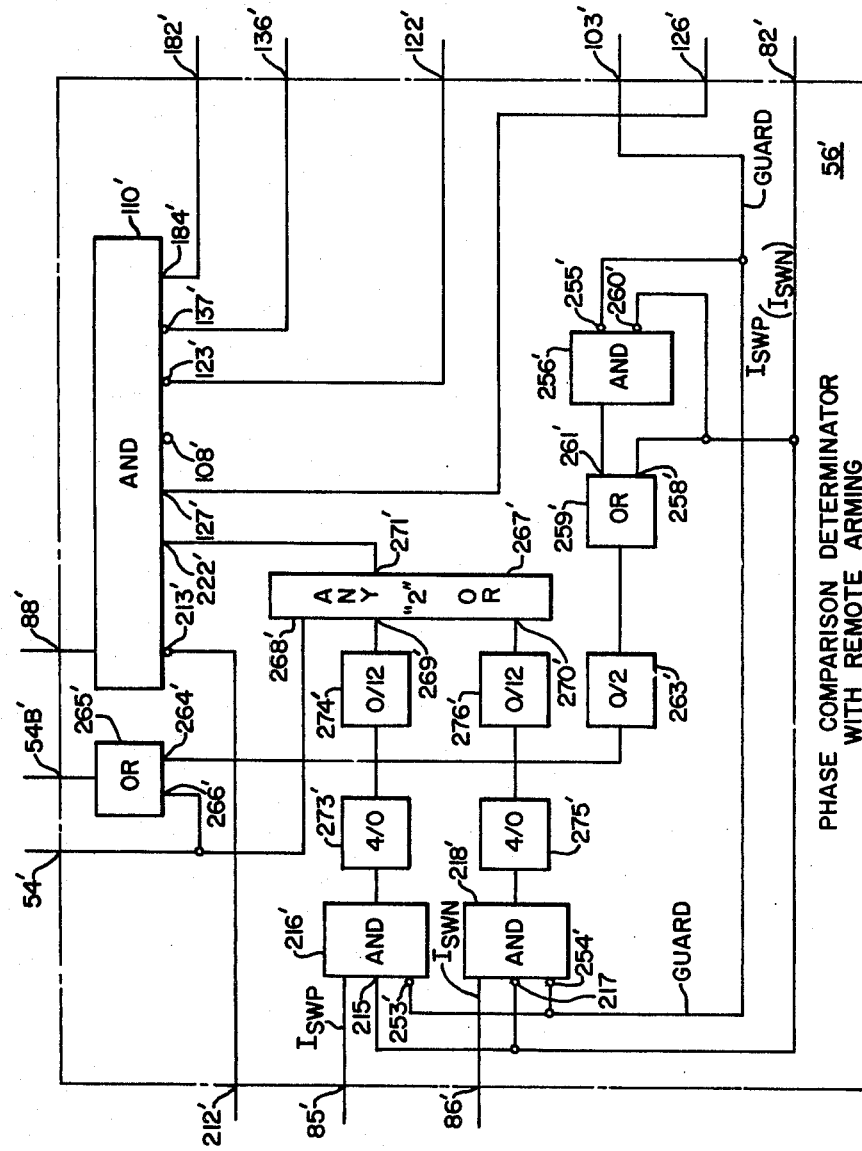
FIG. 17 is a modified form of the apparatus showing circuitry for remotely arming the local arming networks.

The phase comparison determinator 56 as set forth in FIG. 3, is locally armed by the fault detector 58 in the case of networks 20, 21 and 22 or by the $I_L$ overcurrent network 60 in the case of the network 23. A modified form of phase comparison detector 56' is illustrated in FIG. 17 which may be armed either by a local signal or remotely by a signal from the remote station in the absence of guard signal supplied to the input terminal 103' and the presence of the remote $RI_{SW}$ signal supplied to the input terminal 82'. The AND networks 216' and 218' correspond to the AND networks 216 and 218 of the phase comparison determinator 56 but differ therefrom by the addition of NOT input terminal 253' and 254' respectively. The input terminal 103 instead of being connected to the NOT input terminal 108' of the AND network 110' is connected to the two NOT input terminals 253' and 254' and to a NOT input terminal 255' of an AND network 256' so that whenever a guard signal is present, neither of the AND networks 216' or 218' is effective to provide a logical 1 output signal. Such a signal is necessary to place an arming signal at the input terminal 222' of the AND network 110' which arming signal as discussed in the case of detector 56 must be present for any output at the output terminal 88'.

When guard signal is present at terminal 103', there will be no remote $RI_{SW}$ signal present at the terminal 82' and therefore a logical 0 signal is present at the input terminal 258' of the OR network 259' and NOT input terminal 260' of the AND network 256'. Because of the logical 1 guard signal at the NOT input terminal 255' the presence of a logical zero signal at its NOT input terminal 260' prevents any logical 1 input to the terminal 261' of the OR network 259'. The output of the OR network 259' is connected through a timing network 263' to one input terminal 264' of four networks an OR network 265'. The other terminal 266' of the OR network 265' is connected to the input terminal 54' so that the output terminal 54B' will have a logical 1 signal if a logical 1 signal is present at either or both of the input terminals 264' or 266'.

Figure 18:
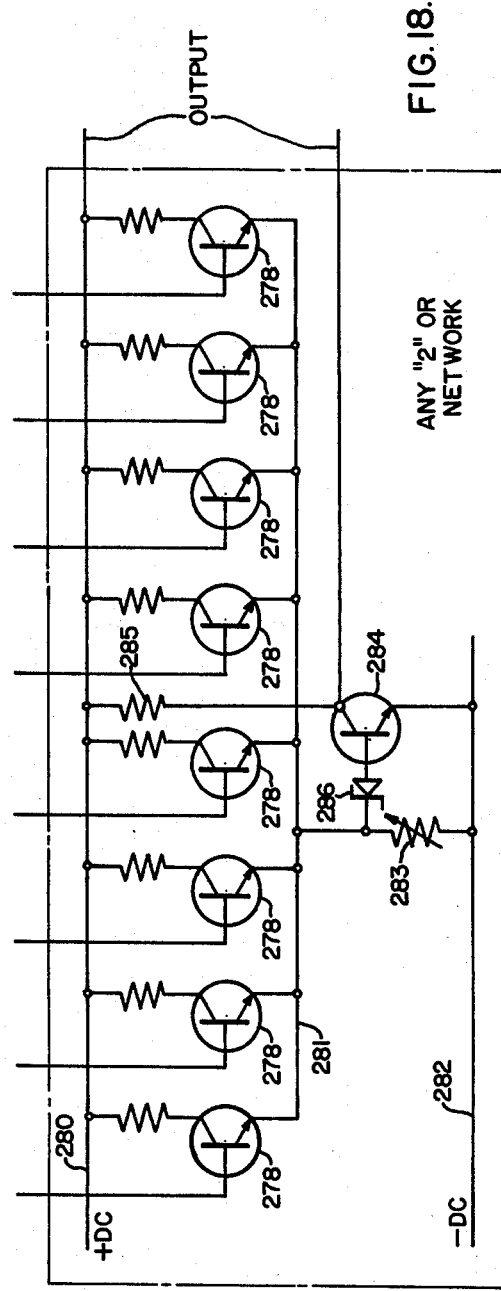
FIG. 18 is a schematic diagram of ANY-2 OR network.

An ANY-2 OR network 267' has three input terminals 268', 269' and 270' and an output terminal 271'. The terminal 54' is connected to the input terminal 268', the output terminal of the AND network 216' is connected through timing networks 273' and 274' to the input terminal 269' while the output terminal of the AND network 218' is connected through a second pair of timing networks 275' and 276' to the input terminal 270'. The ANY-2 OR network 267' may take any of various forms in which two logical 1 inputs are required to provide a logical 1 output. A form of such network is shown in FIG. 18.

When a fault occurs the guard signal at input terminal 103' is removed and a logical 0 signal is provided at terminal 255' of AND network 256' and at the input terminals 253' and 254' of the AND networks 216' and 218'. At the same time the guard signal is removed, the $RI_{SW}$ signal is supplied to the input terminal 82' and the input terminals 215 and 217 of the AND networks 216' and 218' will be alternatingly supplied with logical 1 and logical 0 signals. The input terminals 85' and 86' are supplied with the $RI_{SWPD}$ and $RI_{SWND}$ signals so that the AND networks 216' and 218' will provide logical 1 signals for an internal fault for at least 5 milliseconds and fail to provide such logical 1 signals for 5 consecutive milliseconds in the case of an external fault similarly as described above in the case of the detector 56. The timing networks 274' and 276' provide logical 1 output signals substantially instantaneously with a logical 1 signal applied thereto and have a resetting timing period (indicated as being 12 milliseconds) so that they maintain their logical 1 output signals for 12 milliseconds after removal of the logical 1 input signal thereto. It will be apparent that as long as the internal fault persists the AND networks 216' and 218' in combination with the timers 273', 274', 275' and 276' will maintain logical 1 input signals at the input terminals 269' and 270' so that the output terminal 271' will provide a logical 1 arming signal to input terminal 222' of AND network 110'.

The input terminal of the AND network, 110' corresponding to input terminal 54A of AND network 110 is either omitted as illustrated or is present and is provided with a continuous logical 1 signal. The arming input terminals 213', 127', 123', 137' and 184' are armed as discussed in connection with the terminals 213, 127, 123, 137 and 184 of the AND network 110. Therefore in the case of an internal fault the output terminal 88' will be energized with a logical 1 signal to energize the timing network 90 and thereafter the input terminal of trip board 94.

The logical 1 signal for energizing the output terminal 54B' and the keyer terminal 98 is supplied by the OR network 265' in the absence of a logical 1 signal at terminal 54' by the output signal of the OR network 258'. It will be apparent that in the absence of the guard signal and in the presence of the $RI_{SW}$ signal the input terminals 258' and 261' will be alternatingly supplied with logical 1 signals whereby a logical 1 signal will be supplied by the OR network through the timing nerwork 263' to the input terminal 264' of the OR network 265' to maintain a logical 1 signal at terminal 54B' and at the keyer terminal 98 to remove the transmitted guard signal so that the remote relaying apparatus may actuate the remote breakers even though no logical 1 signal is produced by the fault detector 58 in the case of the networks 20, 21 and 22 and by the $I_L$ network 60 in the case of network 23.

In the event of a logical 1 signal at the input terminals 54' and 266', the OR network can supply its output logical 1 signal irrespective of the logical signal at its terminal 264'. Furthermore, the terminal 54' is also connected to the input terminal 268' so that for the ANY-2 OR network to provide a logical 1 signal to the terminal 222' with only the first to be supplied with a logical 1 signal of the input terminals 269' and 270' has been so supplied.

As illustrated in FIG. 18, the ANY-2 OR network includes a plurality of transistors 278 connected in parallel between a positive D.C. bus 280 and at intermediate potential bus 281 each in series with an individual resistor. The bus 281 is connected to the minus D.C. bus 282 through a resistor 283. An output signal controlling transistor 284 is connected between the busses 280 and 282 through a resistor 285. The base of the transistor 284 is connected through a Zener diode 286 to the common connection between the resistor 283 and the bus 281. The bases of the transistors 278 are connected individually to the input terminals of the ANY-2 OR network. Eight input terminals are illustrated. It will be understood that the number need be no more than necessary for the number of inputs required by the circuitry with which it is used. It will be appreciated that the resistor 283 may be made adjustable and adjusted to determine the required number of transistors 278 which must become conducting before the output transistor 284 will be placed in its conducting state to provide the logical 1 output signal. As indicated in FIG. 18, the ANY-2 OR network is actually an OR network wherein any number not less than two may be required to provide the logical 1 output signal.

In the forms of the invention shown in FIGS. 1 through 19, local arming is individual to each of the phase and ground current responsive networks 20, 21 and 22, 23. In the form of the invention shown in FIG. 20, all of the output circuits of the phase current and ground current relay networks are armed at once by means of an OR network 315 which has its single output connected to one of the inputs of each of the AND networks 316, 317, 318 and 319. The four input terminals of the OR network 315 are connected individually to the four fault detectors located in the phase and ground current responsive relaying networks 320, 321, 322 and 323. These correspond to the networks 20, 21, 22 and 23 of FIG. 1. The networks 320–323 are identical and only one thereof, the ground current responsive network 323, is shown in detail. The fault detector is designated 328. These fault detectors 328 may take the form of either of the fault detectors shown in FIGS. 4 and 19 or any other suitable detection network which will provide a logical 1 signal to the OR network 315 in the event a phase or ground current reaches fault magnitude. For this purpose, phase conductor current responsive transformers 329, 330 and 331 and the residual or ground current responsive transformer 332 are provided and are connected similarly to the connection illustrated in FIG. 1. Each is provided with a loading resistor whereby a voltage responsive to the current in the current transformer is provided at its output.

The ground current responsive transformer 332 energizes a squarer 334 which in turn energizes the time delay timer 336 and keyer 337 in the manner set forth above with respect to FIG. 1. The keyer 337 controls the transmitter frequency control 338 which controls the output frequency of the transmitter-receiver 339 substantially as described in connection with FIG. 1. A pair of AND networks 341 and 342 are provided with output terminals connected to two input terminals of an OR network 343, the output terminals of which are connected to the second input terminal of AND network, 319. The AND networks 341 and 342 operate similarly to the AND networks 216' and 218'. The AND network 341 is provided with a non-inverted input terminal 345, a NOT input terminal 346 and a second non-inverted input terminal 347. The AND network 342 is provided with a non-inverted input terminal 348 and NOT input terminals 349 and 350. The input terminal 345 is energized from the delay timer 336 with its $I_{SWPD}$ signal. The input terminal 348 is also connected to the local delay timer and is supplied with the $I_{SWND}$ signal, in time delay manner to the output of the local squarer 334. One output terminal of the transmitter-receiver 339 is connected to the NOT input terminals 346 and 349 and energizes them with a logical 1 input to the presence of guard signal being received by the transmitter-receiver at the remote station. The input terminals 347 and 350 are connected together and to a second output terminal of the transmitter-receiver 339 which energizes these terminals with a pulsating logical 1 and logical 0 signal in accordance with the $RI_{SW}$ signal supplied in the absence of guard signal being received by the receiver.

If an arming signal has been provided to the AND networks 316–319 by the OR network 315 and in the absence of a guard signal, a proper phase relationship of the $I_{SWPD}$ and $I_{SWND}$ and $RI_{SW}$ signals reppresenting and internal fault will energize the OR network 343 with a logical 1 signal at one or both of its input terminals in sequence whereby it applies a logical 1 signal to the second terminal of the AND network 319 which then enabled to supply a logical 1 signal to the timing network 352 which after a suitable delay, which is shown as being 4 milliseconds, provides a logical 1 output signal to one of the OR input terminals of the OR network 354 which then supplies a tripping signal to the breakers 10, 11 and 12.

Figure 20:
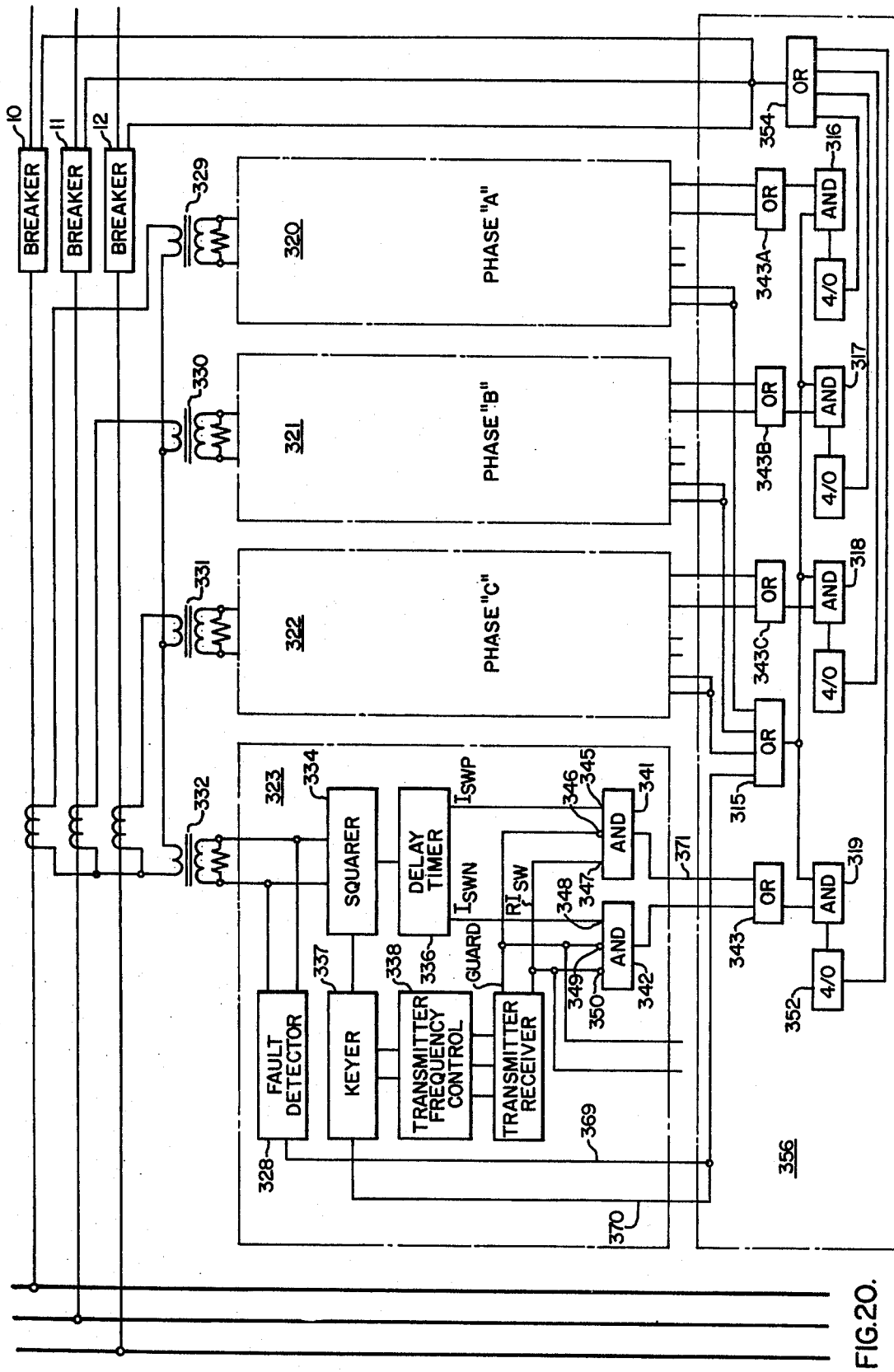
FIg. 20 is a modified form of a relaying system associated with a three phase power transmission line embodying a modified form of the invention.
Figure 21:
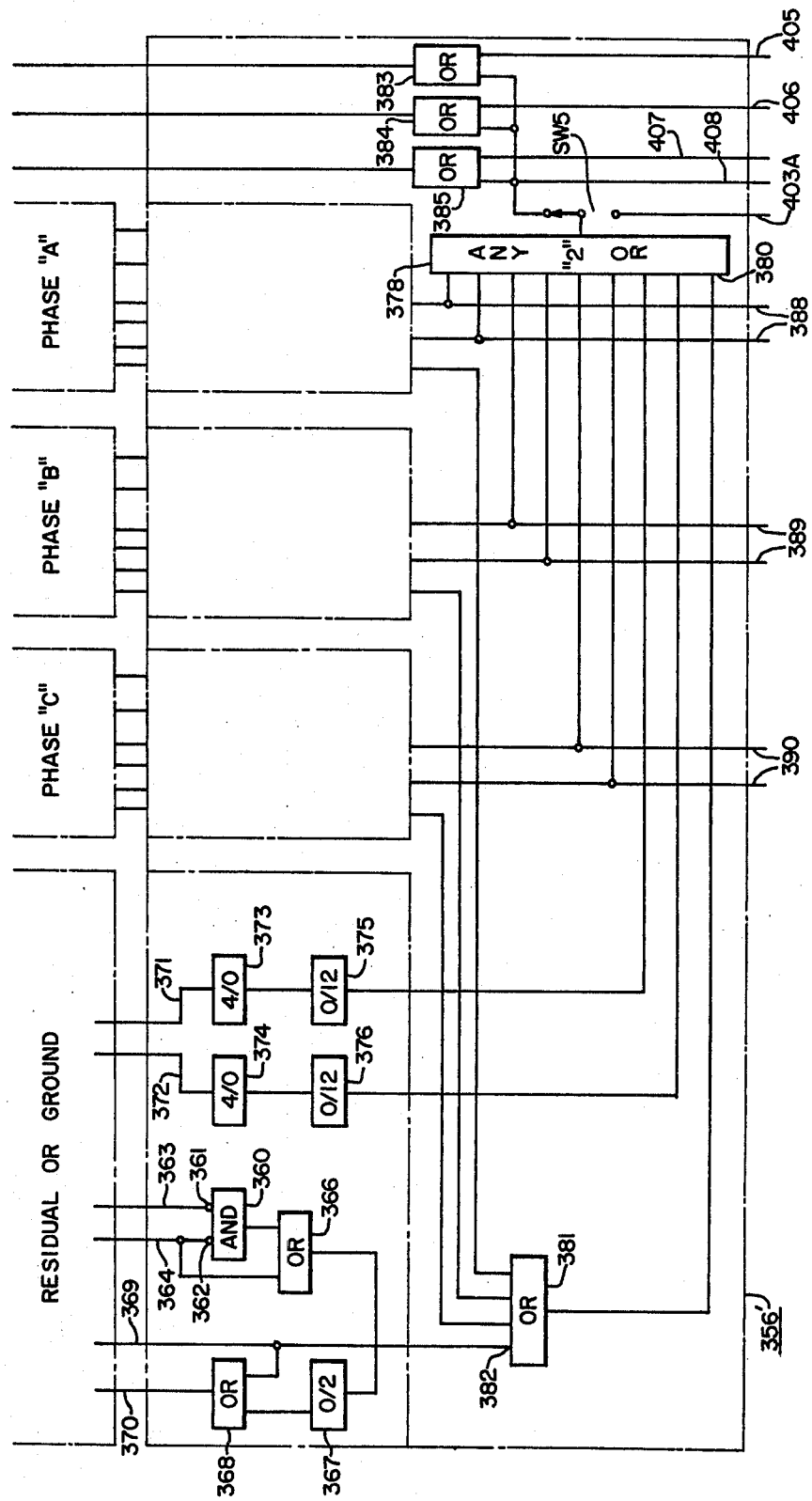
FIG. 21 is a modification suitable for use with the network of FIG. 20 illustrating a form of remote arming associated with common local arming.
Figure 22:
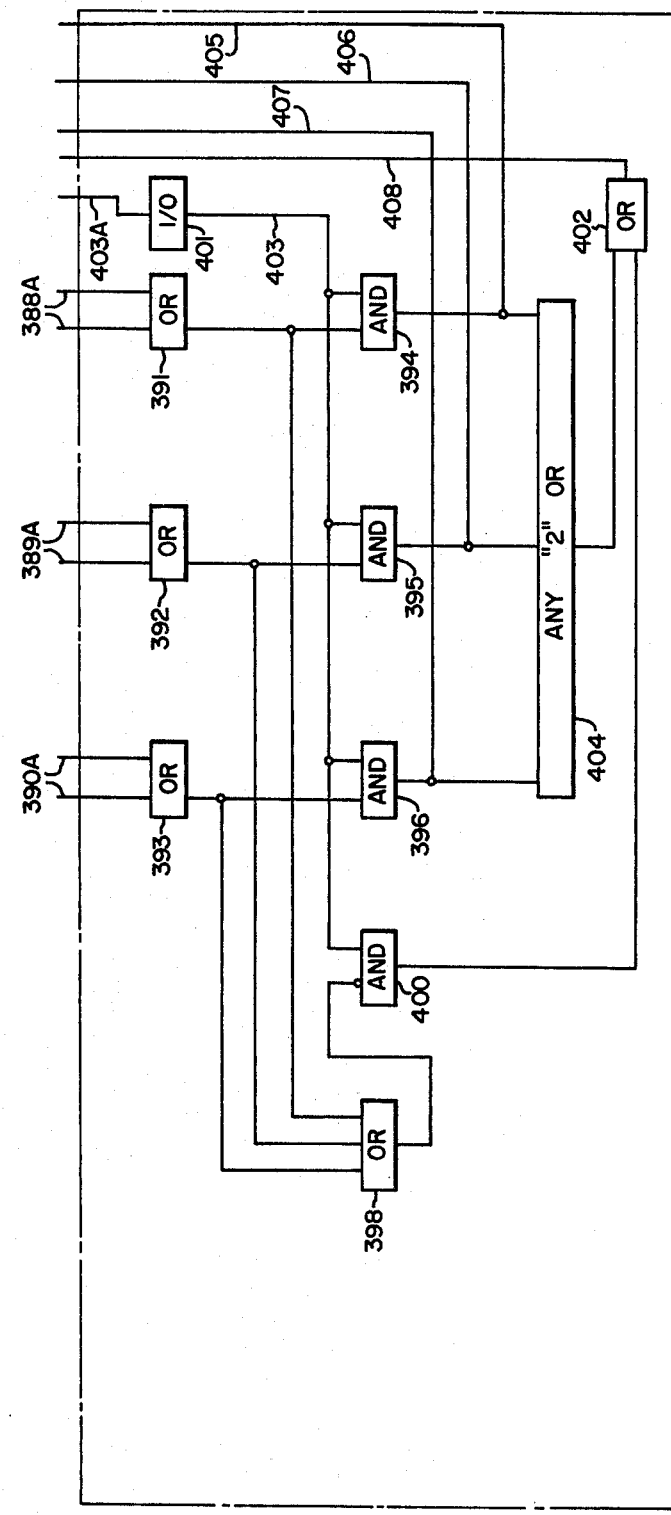
FIG. 22 is a modified form of a tripping network for actuating one or three breakers.

FIG. 21 shows a modified form of tripping network 356′ which may be used in place of the tripping network 356 of FIG. 20. This network 356′ provides structure whereby the remote transmitter can arm the local phase current and ground current networks 320–323. Since the structure for each of the phase A, phase B, phase C and residual or ground current networks is the same, only one thereof is shown in detail. The structure illustrated is associated with the residual or ground network 323. The network 356′ includes an AND network 360, having a pair of NOT input terminals 361 and 362. The guard signal is supplied to the NOT input terminal 361 through a conductor 363 and RI$_{SW}$ signal is applied to the NOT terminal 362 through a conductor 364. The output of the AND circuit 360 is applied to one input terminal of the OR network 366, the other input terminal of which is connected directly to the conductor 364. The output of the OR network 366 is supplied to a timing network 367 (shown as having a substantially instantaneous operation in response to a logical 1 signal to provide a logical 1 output and which will maintain such logical 1 output for 20 milliseconds after the logical 1 input is removed). The output of the network 367 is supplied to one terminal of an OR network 368 having its other input terminal connected to a conductor 369 which, as illustrated in FIG. 21, is energized from by fault detector 328. The output terminal of this OR network 368 is connected by conductor 370 to the keyer 337 so that the keyer 337 may be actuated either upon actuation of the fault detector 328 or by the RI$_{SW}$ signal.

The AND networks 341 and 342 are connected by conductors 371 and 372 to the timing networks 373 and 374 respectively. These networks are designated by the designation 5/0 as providing a 5 millisecond delay to a logical 1 signal and no intentional delay in resetting. The output of these timing networks 373 and 374 is connected to further timing networks 375 and 376 respectively and to two of the input terminals of an ANY-2 OR network 378. The ANY-2 OR network 378 is provided with an arming input terminal 380 which is connected to the output terminal of an OR network 381 which has one of its input terminals 382 connected to the conductor 369 connected to the fault detector 328. The ANY-2 OR network 378 will provide a logical 1 signal at its output when logical 1 signals are supplied to any two of its input terminals. The OR network may therefore be energized solely from any two of the timing networks 375 and 376 independently of the signal supplied by the OR network 382 or from the OR network, any one of the timing networks 375 or 376.

Upon energization of its output terminal, the ANY-2 OR network 378 (with the switch SW5 in the illustrated position) will apply a logical 1 signal to one of the input terminals of each of the OR networks 383, 384 and 385 whereby a tripping signal is applied to each of the breakers 10, 11 and 12. Similarly, the phase A, phase B and phase C networks are connected to pairs of input terminals of the ANY-2 OR network 378 and also to input terminals of the OR network 381.

FIG. 21 shows a network which when combined with the network of FIG. 20 will provide single or simultaneous tripping of the breakers 10, 11 and 12 when the switch SW5 is changed to its other position. The pairs of the output terminals 388, 389 and 390 of the tripping network 356′ which are controlled by the phase A, phase B and phase C fault responsive networks 320, 321 and 322 are connected to the pairs of input terminals 388A, 389A and 390A which are connected to the pairs of input terminals of OR networks 391, 392 and 393 respectively. The output of the OR networks 391, 392 and 393 are connected to one input terminal of AND networks 394, 395 and 396 respectively and to the three input terminals of an OR network 398. The output of the OR network is applied to the NOT input terminal of AND network 400, the output terminal of which is connected to one input terminal of an OR network 402. The outer input terminals of the AND networks 394, 395, 396 and 400 are all connected to a conductor 403 which is connected through a time delay network 401, conductor 403A and the switch SW5 to the output terminal of the ANY-2 OR network 378 whereby the AND networks 394, 395, 396 and 400 can provide logical 1 output signals solely subsequent to the provision of a logical 1 output by the ANY-2 OR network 378. The output terminals of the AND networks 394, 395 and 396 are applied individually to input terminals of an ANY-2 OR network 404, the output terminal of which is connected to the second input terminal of the OR network 402.

The output terminals of the AND networks 394, 395 and 396 are connected by conductors 405, 406 and 407 to second input terminals of the OR networks 383, 384 and 385 respectively. When a logical 1 signal is provided by the conductor 403 to the AND networks 394, 395 and 396 they will be enabled to provide individual logical 1 output signals to individually trip the associated breaker when energized by a logical 1 output signal from the OR networks 391, 392 or 393.

Since the output of each of the OR networks 391, 392 and 393 are connected to the input terminals of the OR network 398, the energization of any one of the output terminals thereof by a logical 1 will cause the OR network 398 to apply a logical 1 signal to the NOT input terminal of the AND network 400. This signal renders the AND network 400 ineffective to provide a logical 1 signal to the OR network 402 when the time delay network 401 acts to provide a logical 1 signal to the conductor 403 so that one of the breakers directly actuates by its AND network 394, 395 or 396 as the case may be will be tripped. If however, two or more of the networks 394, 395 and 396 supply a logical 1 output two of the input terminals of the ANY-2 OR network 404 will be energized by logical 1 signals. This results in a logical 1 signal at the other input terminal of the OR network 402 and a logical 1 signal on conductor 408 which connects the OR network 402 to each of the OR networks 383, 384 and 385 whereby all of the breakers 10, 11 and 12 will be tripped.

If the residual or ground current network 323 indicated the presence of a fault without the response thereto of a phase network 320–322 none of the pairs of terminals 388A, 389A and 390A will receive logical 1 signals and none of the OR networks 391, 392 and 393 will provide logical 1 signals to the OR network 398 so that the AND network is enabled to provide a logical 1 signal to the OR network 402 when a logical 1 is supplied by the conductor 403. As discussed in connection with the ANY-2 OR network 404, this results in the OR network 402 supplying a logical 1 signal to the conductor 408 which results in the OR networks 383, 384 and 385 causing all of the breakers 10, 11 and 12 to trip.

It will now be apparent that there has been disclosed a protective relaying network which is very secure and dependable and one which will not respond to spurious signals and provide incorrect tripping of the breakers.

What is claimed and is desired desired be secured by United States Letters Patent is as follows:

1. In a phase comparison unblocking relaying apparatus, a receiving apparatus, said receiving apparatus normally maintaining a first pair of normal logic signal outputs whenever a normal non-fault signal is being received by said receiving apparatus, a first comparing network having a plurality of input terminals and an output terminal, means interconnecting a first of said input terminals of said comparing network to said receiving apparatus for energization by one of said first normal logic signal outputs, said receiving apparatus being effective to supply a first operating logic signal to said first input terminal of said comparing network when said receiving apparatus is receiving said one non-fault normal logic signal output, a timer having an input and an output and operable to delay the change in energization of its said output for a predetermined timing interval subsequent to a change in energization of its said input, means operatively connecting said input of said timer to said receiving apparatus whereby the removal of said one normal non-fault logic signal output of said receiving apparatus will change the energization of said input of said timer, an AND network having a plurality of input terminals and an output terminal, circuit means operatively connecting said receiving apparatus to a first of said input terminals of said AND network to provide a second operating logic signal to said first input terminal of said AND network solely in the absence of a selected one of said first pair of normal logic signal outputs from said receiving apparatus, circuit means operatively connecting said output of said timer to a second of said input terminals of said AND network to provide a third operating logic signal to said second input terminal of said AND network solely prior to the timing out of said timer, a fault detector having an output terminal connected to a third of said input terminals of said AND network and to a second of said input terminals of said comparing network, said fault detector being effective to supply fourth and fifth operating logic signals to said third input terminal of said AND network and said second input terminal of said comparing network respectively solely as a consequence of the operation of said fault detector in response to a fault, said receiving apparatus being effective to provide a second output signal which changes in character in response to changes in the character of said transmitted fault signal, a local signal supplying means having a local signal which changes in character, a signal character comparing network connected to be energized by said second output signal provided by said receiving apparatus and by said local signal provided by said local signal supplying means, means connecting said signal character comparing network to a third of said input terminals of said first comparing network, said signal comparing network being effective to provide a sixth operating logic signal to said third input terminal of said first comparing network solely at first predetermined relative relations of said characters of said second output signal from said receiving apparatus and said normal local signal from said local signal supplying means, said first comparing network being effective to provide a first tripping signal at its said output terminal solely when operating logic signals are being supplied to its said first and second and third input terminals, said AND network being effective to provide a second tripping signal at its said output terminal solely when operating logic signals are being supplied to its said first and second and third input terminals.

2. The apparatus of claim 1 in which said output of said timer is operatively connected to a fourth of said input terminals of said first comparing network whereby a seventh operating signal is applied thereto by said timer prior to the timing out of its said timing interval and a non-operating signal is applied thereto by said timer upon the timing out of its said timing interval.

3. The apparatus of claim 2 in which there is provided a second and a third timer, each said second and third timer having an input and an output and being effective to delay the change in energization of its said output for a predetermined timing interval subsequent to a change in energization of its said input from a first to a second condition, said second timer having its said input operatively connected to said output terminal of said first comparing network whereby the energization of its said input is changed from its said first to its said second condition as a consequence of the occurrence of said first tripping signal, said third timer having its said input operatively connected to said output terminal of said AND network whereby the energization of its said input is changed from its said first to its second condition as a consequence of the occurrence of said tripping signal at said output terminal of said AND network.

4. The apparatus of claim 3 in which said third timer has a longer said predetermined timing interval than said predetermined timing interval of said second timer.

5. The apparatus of claim 4 in which each of said second and third timers reset to its initial condition or a consequence of the change in energization of its said input from its said second to its said first condition, the time required for said third timer to reset to its initial condition being longer than the time required for said second timer to reset to its initial condition.

6. In a protective relaying system for protecting a transmission line having local and remote terminals, first and second relaying apparatus located at said local and said remote terminals respectively, each said apparatus having a line current sensing device coupled to the said line portion with which it is associated and effective to provide phase and magnitude indications of the current sensed thereby, a communication channel between said terminals, each said apparatus including a receiver and a transmitter connected to said channel for receiving signals from and transmitting signals to said channel at the portions thereof adjacent said terminal with which said apparatus is associated, each said receiver providing at least two output quantities when a fault condition exists at said remote terminal, a first of said output quantities having a characteristic which represents the current characteristic at said remote terminal, a second of said quantities having a characteristic which indicates a satisfactory reception of the fault signal from said channel each said apparatus including first circuit means connecting its said current sensing device to its said transmitter whereby its said transmitter is keyed to transmit a signal having a first characteristic determined by the phase of the current sensed by its said current sensing device, each said apparatus having a first and a second comparing network, each said comparing network having a plurality of input terminals and an output terminal, each said comparing network being effective to provide an actuating signal at its said output terminal solely when each of its said input terminals is supplied with an operating signal, each said apparatus including a current magnitude sensor, each said apparatus having a second circuit means connecting its said current magnitude sensor to its said current sensing device and to a first of said input terminals of its said comparing networks, each said current magnitude sensor being effective to provide an operating signal over its associated said second circuit means to said first input terminals of its associated said comparing networks solely when the magnitude of the current sensed by its associated said current sensing device is above a predetermined minimum magnitude, each said apparatus including a first timer having an input and an output and normally effective to provide an operate signal at its said output, each said apparatus including a third circuit means connecting said input of its said timer to its said receiver for energization by its said second quantity, said first timer being effective in response to the continuing absence of said first quantity to provide a non-operate signal at its said output subsequent to a predetermined time interval after the initiation of the absence of said first quantity, each said apparatus including a fourth circuit means connecting said output of its said timer to a second of said input terminals of its said comparing networks and normally effective to supply said operate signal to the said input terminals to which it is connected, fourth circuit means connected to a third of said input terminals of the said comparing networks of the said apparatus with which it is associated and energized by said second quantity, each said apparatus including signal comparing means having a first input circuit connecting to the said receiver of the associated said apparatus for energization by its said first quantity and a second input circuit connected to the said first circuit means of the associated said apparatus for energization of said second input circuit by the said first characteristic, said signal comparing means having an output circuit connected to a fourth input terminal of the associated said first comparing network each said apparatus having a second and a third timer for timing out a timed interval, said second timer having an input connected to said output terminal of the associated said first comparing network, said third timer having an input connected to said output terminal of the associated said second comparing network, each said timer being effective to time out its said interval in response to the occurrence of said actuating signal at the said output terminal to which it is connected, each said apparatus including a breaker tripping circuit operatively connected to said output terminals of its said second and its said third timers.

7. The system of claim 6 in which the said timing interval of said third timer is longer than the said timing interval of said second timer.

8. The system of claim 7 in which each said current magnitude sensor is provided with a second output which is connected to a fifth of said input terminals of the said first comparing network and a fourth of said input terminals of its said second comparing network of the said apparatus with which such said sensor is associated, each said current magnitude sensor being effective to supply an operate signal to the fourth and fifth input terminals to which it is connected solely when the magnitude of the current sensed by said magnitude sensor is above a predetermined minimum magnitude.

9. In a protective relaying system for protecting a polyphase transmission line having a line conductor for each of said phases, said system comprising an apparatus for each of said phases; each said apparatus including a plurality of AND networks, a plurality of timers, a fault detector, a receiver, a signal phase comparing network, said receiver having a first output connected to first input terminals of first and second of said AND networks for supplying signals thereto, said receiver being effective when receiving a signal indicative of the reception of a fault responsive signal to supply operating signals to each of said just-named first input terminals and to energize a first input terminal of said phase comparing network with a signal which is representative of the remote line operating characteristic being transmitted to said receiver, means connected to a second of said input terminals of said phase comparing network and effective to energize said just mentioned second input terminal with a signal which is representative of the local line operating characteristic, said fault detector having an output terminal connected to second input terminals of said first and said second AND networks and effective to provide an operating signal to said just-named second input terminals solely when said fault detector is responding to a fault condition, a first of said timers having an input connected to said receiver and an output connected to a third input terminal of said first and second AND networks, said timer being effective in the absence of an output signal from said receiver to time out a time interval and to thereafter supply a non-operating signal to said just-named third input terminals, a second of said timers having an input connected to said output of said first AND network, a third of said timers having an input connected to said output of said second AND network, said first and said second AND networks being effective to provide an operating signal to the said one of said timers associated therewith solely when all of its said input terminals are energized with an operating signal, a breaker operating network, each of said second and said third timers being effective when timed out to actuate said breaker operating network.

10. The system of claim 9 which includes a said apparatus for each of said phase conductors, each said fault detector being individually associated with the said phase conductor with which its said apparatus is associated and effective to provide a current signal which is proportional to the magnitude of the current in the said phase conductor with which it is associated, phase current interrupting circuit breaker individually associated with each of said phase conductors, each said breaker operating network being individually associated with the one of said breakers which is associated with the one of said phase conductors with which its said apparatus is associated and being effective when actuated to trip individually the said breaker with which such breaker operating network is associated.

11. In a phase comparison unblocking relaying apparatus, a receiving apparatus, said receiving apparatus normally maintaining a first normal logic signal whenever a normal transmitting signal is being received by said receiving apparatus, a first comparing network having a plurality of input terminals and an output terminal, means interconnecting a first of said input terminals of said comparing network to said receiving apparatus for energization by said first normal logic signal, said receiving apparatus being effective to supply a first operating logic signal to said first input terminal of said comparing network when said receiving apparatus has said normal logic, a timer having an input and an output and operable to delay the change in energization of its said output for a predetermined timing interval subsequent to a change in energization of its said input, means operatively connecting said input of said timer to said receiving apparatus whereby the removal of said first normal logic signal of said receiving apparatus will change the energization of said input of said timer, an AND network having a plurality of input terminals and an output terminal, circuit means operatively connecting said output of said timer to a first of said input terminals of said AND network to provide a second operating logic signal to said first input terminal of said AND network solely prior to the timing out of said timer, a fault detector having an output terminal connected to a second of said input terminals of said AND network and to a second of said input terminals of said comparing network, said fault detector being effective to supply third and fourth operating logic signals to said second input terminal of said AND network and said second input terminal of said comparing network respectively solely as a consequence of the operation of said fault detector in response to a fault; said first comparing network being effective to provide a first tripping signal at its said output terminal solely when operating logic signals are being supplied to its said first and second input terminals, said AND network being effective to provide a second tripping signal at its said output terminal solely when operating logic signals are being supplied to its said first and second input terminals.

12. The apparatus of claim 11 in which said receiving apparatus is provided with an output terminal operatively connected to a third of said input terminals of said AND network to provide a fifth operating logic signal thereto upon the failure of said receiving apparatus to provide a desired output at its said output terminal.

13. The apparatus of claim 12 in which said output of said timer is operatively connected to a fourth of said input terminals of said first comparing network whereby a sixth operating signal is applied thereto by said timer prior to the timing out of its said timing interval and a non-operating signal is applied thereto by said timer upon the timing out of its said timing interval.

14. The apparatus of claim 13 in which there is provided a second and a third timer, each said second and third timer having an input and an output and being effective to delay the change in energization of its said output for a predetermined timing interval subsequent to a change in energization of its said input from a first to a second condition, said second timer having its said input operatively connected to said output terminal of said first comparing network whereby the energization of its said input is changed from its said first to its said second condition as a consequence of the occurrence of said first tripping signal, said third timing having its said input operatively connected to said output terminal of said AND network whereby the energization of its said input is changed from its said first to its said second condition as a consequence of the occurrence of said tripping signal at said output terminal of said AND network.

15. The apparatus of claim 14 in which said third timer has a longer said predetermined timing interval than said second timer.

16. The apparatus of claim 15 in which each of said second and third timers is reset to its initial condition as a consequence of the change in energization of its said input from its said second to its said first condition, the time required for said third timer to reset to its initial condition being longer than the time required for said second timer to reset to its initial condition.

* * * * *